(12) United States Patent
Yoshida

(10) Patent No.: US 7,981,559 B2
(45) Date of Patent: Jul. 19, 2011

(54) FUEL CELL SYSTEM SUPPLY HAVING A MEASURING DEVICE AND A CONTROL DEVICE

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1159 days.

(21) Appl. No.: 10/585,761

(22) PCT Filed: Mar. 16, 2005

(86) PCT No.: PCT/JP2005/005294
§ 371 (c)(1),
(2), (4) Date: Jul. 12, 2006

(87) PCT Pub. No.: WO2005/088755
PCT Pub. Date: Sep. 22, 2005

(65) Prior Publication Data
US 2008/0220303 A1 Sep. 11, 2008

(30) Foreign Application Priority Data
Mar. 17, 2004 (JP) ................ 2004-076748

(51) Int. Cl.
H01M 8/04 (2006.01)
(52) U.S. Cl. .............. 429/446; 429/443; 429/408
(58) Field of Classification Search .......... 429/408, 429/443, 446
See application file for complete search history.

(56) References Cited

U.S. PATENT DOCUMENTS 6,342,316 B1 * 1/2002 Okamoto et al. .......... 429/424
6,451,467 B1 * 9/2002 Peschke et al. ............ 429/23
6,887,603 B2 * 5/2005 Kasahara et al. ........ 429/423
(Continued)

FOREIGN PATENT DOCUMENTS

JP  A 6-223859  8/1994
(Continued)

OTHER PUBLICATIONS

JPO IPDL machine translation of JP06223859, published Aug. 12, 1994, retrieved on Mar. 3, 2010.*

(Continued)

*Primary Examiner* — Barbara L Gilliam
*Assistant Examiner* — Zachary Best
(74) *Attorney, Agent, or Firm* — Oliff & Berridge, PLC

(57) ABSTRACT

A fuel cell system that generates electricity using an electrochemical reaction of fuel gas and oxidizing gas, having: a pressure adjustment valve which is provided on a fuel gas supply path for conducting the fuel gas from a fuel gas supply source to a fuel cell and which adjusts the supply gas pressure of the fuel gas; a degree of opening adjustment valve provided downstream of the pressure adjustment valve on the fuel gas supply path, the degree of opening thereof being set in stages or continuously in accordance with a degree of opening signal; and control means that adjusts the degree of opening adjustment signal in accordance with the operating condition of the fuel cell system and controls the state quantity of fuel gas supplied to the fuel cell to a target quantity. In this way, the pressure of fuel gas (for example, hydrogen gas) whose pressure has been reduced by the pressure adjustment valve can be further adjusted to the target pressure by the degree of opening adjustment valve provided downstream of the pressure adjustment valve in accordance with the operating condition of the fuel cell system.

14 Claims, 15 Drawing Sheets

U.S. PATENT DOCUMENTS

| | | |
|---|---|---|
| 2002/0094467 A1* | 7/2002 | Nonobe et al. .................. 429/34 |
| 2002/0175010 A1 | 11/2002 | Kobayashi et al. |
| 2003/0180599 A1 | 9/2003 | Kamihara |
| 2004/0067399 A1* | 4/2004 | Kobayashi et al. ............. 429/25 |
| 2004/0241511 A1 | 12/2004 | Kamihara et al. |
| 2006/0251935 A1 | 11/2006 | Barret et al. |

FOREIGN PATENT DOCUMENTS

| | | |
|---|---|---|
| JP | A 11-154528 | 6/1999 |
| JP | A 2002-216811 | 8/2002 |
| JP | A 2002-231277 | 8/2002 |
| JP | A 2002-231278 | 8/2002 |
| JP | B2 3349742 | 9/2002 |
| JP | A 2002-352837 | 12/2002 |
| JP | A 2003-68334 | 3/2003 |
| JP | A 2003-331889 | 11/2003 |
| JP | A 2004-55295 | 3/2005 |
| WO | WO 03/019707 A1 | 3/2003 |
| WO | WO 03/096460 1 | 11/2003 |
| WO | WO 03/096460 A1 | 11/2003 |

OTHER PUBLICATIONS

JPO IPDL machine translation of JP2002216811, published Aug. 2, 2002, retrieved on Jul. 12, 2006.*

* cited by examiner

FUEL CELL SYSTEM SUPPLY HAVING A MEASURING DEVICE AND A CONTROL DEVICE

BACKGROUND

The present invention relates to a fuel cell system that generates electricity using fuel gas and oxidizing gas.

In fuel cell systems fuel gas (hydrogen) is compressed and stored in a high pressure tank or similar. During operation of the fuel cell system the pressure of the fuel gas is reduced to the required pressure and supplied to the fuel cell. To reduce the pressure of the high pressure fuel gas a pressure adjustment valve (regulator), for example, is used, but it is difficult to carry out pressure adjustment over a wide range with a single pressure adjustment valve. Therefore in Japanese Patent Application Laid-open No. H11-154528 for example, a fuel cell system is proposed in which high and low pressure adjustment valves are provided in series to reduce the pressure of the fuel gas in stages, and by supplying the fuel gas at the reduced pressure via a solenoid valve (on-off valve) a low cost low pressure solenoid valve can be used.

SUMMARY

However, by combining a pressure adjustment valve (regulator) and solenoid valve (on-off valve) in this way, the adjustment range of the fuel gas supply pressure to a fuel cell is restrictive, and it is difficult to adjust the supply pressure and supply flow rate of fuel gas to the fuel cell to the desired value (target value) in accordance with the fuel cell operating condition.

Therefore, it is an object of the present invention to propose a fuel cell system in which the fuel gas supply pressure and supply flow rate can be easily adjusted to the desired value (target value) in a fuel cell system in which a pressure adjustment valve (regulator) and solenoid valve (on-off valve) are used in the fuel gas supply passages.

In order to achieve this object, the fuel cell system according to the present invention is a fuel cell system that generates electricity using an electrochemical reaction of fuel gas and oxidizing gas, comprising: a fuel gas supply path that conducts the fuel gas from a fuel gas supply source to a fuel cell; a pressure adjustment valve provided on the fuel gas supply path that adjusts the supply gas pressure of the fuel gas; a degree of opening adjustment valve provided downstream of the pressure adjustment valve on the fuel gas supply path, the degree of opening thereof being set in accordance with a degree of opening signal; and control means that adjusts the degree of opening adjustment signal in accordance with the operating condition of the fuel cell system and controls the state quantity of fuel gas supplied to the fuel cell to a target quantity.

According to this configuration, the pressure of fuel gas (for example, hydrogen) whose pressure has been reduced by the pressure adjustment valve can be adjusted to the target pressure by the degree of opening adjustment valve provided downstream of the pressure adjustment valve in accordance with the operating condition of the fuel cell system.

The degree of opening of the degree of opening adjustment valve can be set for example by adjusting (setting) the ratio of opening time and closing time on the time axis of a solenoid on-off valve whose drive source is electromagnetic power (PWM control). Also, the degree of opening of the valve can be adjusted (set) by continuously moving the opening and closing gate within the valve provided on the gas supply path using an actuator whose drive source is electromagnetic power, such as a rotary or linear motor. Also, the degree of opening adjustment valve can be set with a plurality of degree of opening stages between the "fully open" state and the "fully closed" state.

The above mentioned pressure adjustment valve may be a mechanical pressure adjustment valve. Also, the degree of opening adjustment valve may be an electromagnetically driven valve (solenoid valve) whose drive source is electromagnetic power, as stated above. By combining a mechanical type pressure adjustment valve that is capable of a relatively large pressure reduction but for which linear pressure reduction characteristics are difficult to obtain with an electromagnetic type degree of opening adjustment valve with good linear pressure reduction characteristics and response, it is possible to more accurately adjust the fuel gas supply pressure and the supply flow rate.

The pressure adjustment valve and degree of opening adjustment valve may be integrated.

The state quantities of fuel gas include for example gas pressure and gas flow rate. By making it possible to arbitrarily adjust the valve degree of opening of the degree of opening adjustment valve, it is possible to appropriately control the fuel gas (generation control, discharge of excess product water to the outside, discharge of impurity gases to the outside, or the like).

The control means adjusts the degree of opening adjustment signal to control the valve degree of opening of the degree of opening adjustment valve in accordance with at least one of the fuel cell power generation amount (or the hydrogen consumption rate), the hydrogen purge amount, the degree of opening characteristics of the solenoid valve, the pressure adjustment valve characteristics, and the pressure difference between the fuel cell cathode side gas pressure and the anode side gas pressure (pressure difference between electrodes). The operating condition of the fuel cell system can be determined from the fuel cell power generation amount (or the hydrogen consumption rate), the hydrogen purge amount, the pressure adjustment valve characteristics, the fuel cell pressure difference between electrodes, and other operating parameters, and the control unit controls the degree of opening adjustment valve in accordance with the operating parameters.

Preferably in the fuel cell system, a pressure sensor is provided downstream of the degree of opening adjustment valve, and the degree of opening adjustment signal is adjusted in accordance with the measured pressure by the pressure sensor to control the degree of opening of the degree of opening adjustment valve. In this way, it is possible to accurately set the supply gas pressure and the supply gas flow rate of the fuel gas.

Preferably in the fuel cell system, a fuel gas return flow path that returns fuel gas discharged from the outlet of the fuel cell to the fuel gas, supply path is provided, and the degree of opening adjustment valve is provided on the fuel gas supply path upstream of the junction of the fuel gas return flow path and the fuel gas supply path. In this way fuel gas not used in the fuel cell (fuel offgas) is reused, which improves the fuel consumption.

Preferably in the fuel cell system, a fuel gas return flow pump (for example, a hydrogen gas return flow pump) is provided on the fuel gas return flow path (for example, a hydrogen gas return flow path), and the degree of opening adjustment signal is adjusted in accordance with the pump load on the fuel gas return flow pump, to control the degree of opening of the degree of opening adjustment valve.

According to the configuration, it is possible to make the fuel gas return flow pump small capacity and small size.

Preferably in the fuel cell system, means for measuring the initial deviation of the degree of opening adjustment valve is provided, wherein when controlling the degree of opening adjustment valve, the degree of opening is adjusted in accordance with the initial deviation. The initial deviation can be for example the rate of gas leakage.

In this way, it is possible to take into consideration differences in operating characteristics of individual degree of opening adjustment valves, and improve the accuracy. For example, the initial deviation can be measured from the upstream and downstream pressure of the degree of opening adjustment valve.

The fuel cell system includes a fuel gas return flow path that returns fuel offgas discharged from the outlet of the fuel cell to the fuel gas supply path, wherein the junction of the fuel gas return flow path and the fuel gas supply path is set upstream of the pressure adjustment valve on the fuel gas supply path.

According to this configuration, return flow gas (fuel offgas) is supplied upstream of the pressure adjustment valve, so the fuel gas flow rate to the inlet of the fuel cell including the return flow gas can be adjusted by the pressure adjustment valve and the degree of opening adjustment valve, which improves the accuracy of supply of fuel gas.

The fuel cell system has a plurality of degree of opening adjustment valves on the fuel gas supply path, and the control means adjusts the degree of opening adjustment signal so that the valve degree of opening of each degree of opening adjustment valve equals a target value, or controls the fuel gas supply to become the target condition.

According to this configuration, the plurality of degree of opening adjustment valves are operated simultaneously, individually or in sequence, and the degree of opening of the valves is controlled so that the supply fuel gas condition becomes the target condition, which improves the response and accuracy of supply rate.

Preferably the plurality of degree of opening adjustment valves are provided mutually in parallel or in series, or connected mixed series-parallel in which both parallel connection and series connection is provided. In this way more complex control forms can be achieved.

Preferably the flow rate characteristics (for example, valve degree of opening, orifice diameter, or the like) of the plurality of degree of opening adjustment valves are different from each other. In this way it is possible to control the supply of fuel gas with good accuracy, by using the degree of opening adjustment valve with the required flow rate characteristics in accordance with the operating condition.

Preferably the operating condition of the fuel cell system is the operating condition when the fuel cell is operating (not stopped).

According to the present invention, by combining the pressure adjustment valve and degree of opening adjustment valve, fuel gas whose pressure has been reduced by the pressure adjustment valve is adjusted by the degree of opening adjustment valve to the target pressure in accordance with the operating condition of the fuel cell system, so it is possible to obtain control characteristics that are difficult to achieve with a single pressure adjustment valve, in other words, a wide range of gas supply conditions (gas pressure, gas flow rate).

Also, the present invention is applicable to systems in which the power generation amount required for the fuel cell varies (for example, a vehicle whose energy is provided by a fuel cell).

DETAILED DESCRIPTION

In the embodiments of the present invention, a solenoid valve whose degree of opening can be adjusted is arranged downstream of a pressure adjustment valve that reduces the supply pressure of the fuel gas, hydrogen, and by controlling the solenoid valve in accordance with the fuel cell operating parameters or the like, the supply pressure of hydrogen gas to the fuel cell can be set to the desired pressure. The operating parameters include power generation (or hydrogen consumption rate, vehicle accelerator pedal degree of opening), hydrogen purge amount, degree of opening characteristics of the solenoid valve, pressure adjustment valve characteristics, and the difference in pressure between the gas pressure of the fuel cell cathode side and anode side (pressure difference between electrodes). For example, the degree of opening of the solenoid valve is set by setting the ratio of time of opening and closing the on-off valve in a specific time period on the time axis (Pulse Width Modulation (PWM)). Also, the degree of opening of the solenoid valve is set to move the valve body, restrictor, or similar continuously using drive means such as a pulse motor.

Embodiment 1

Figure 1:
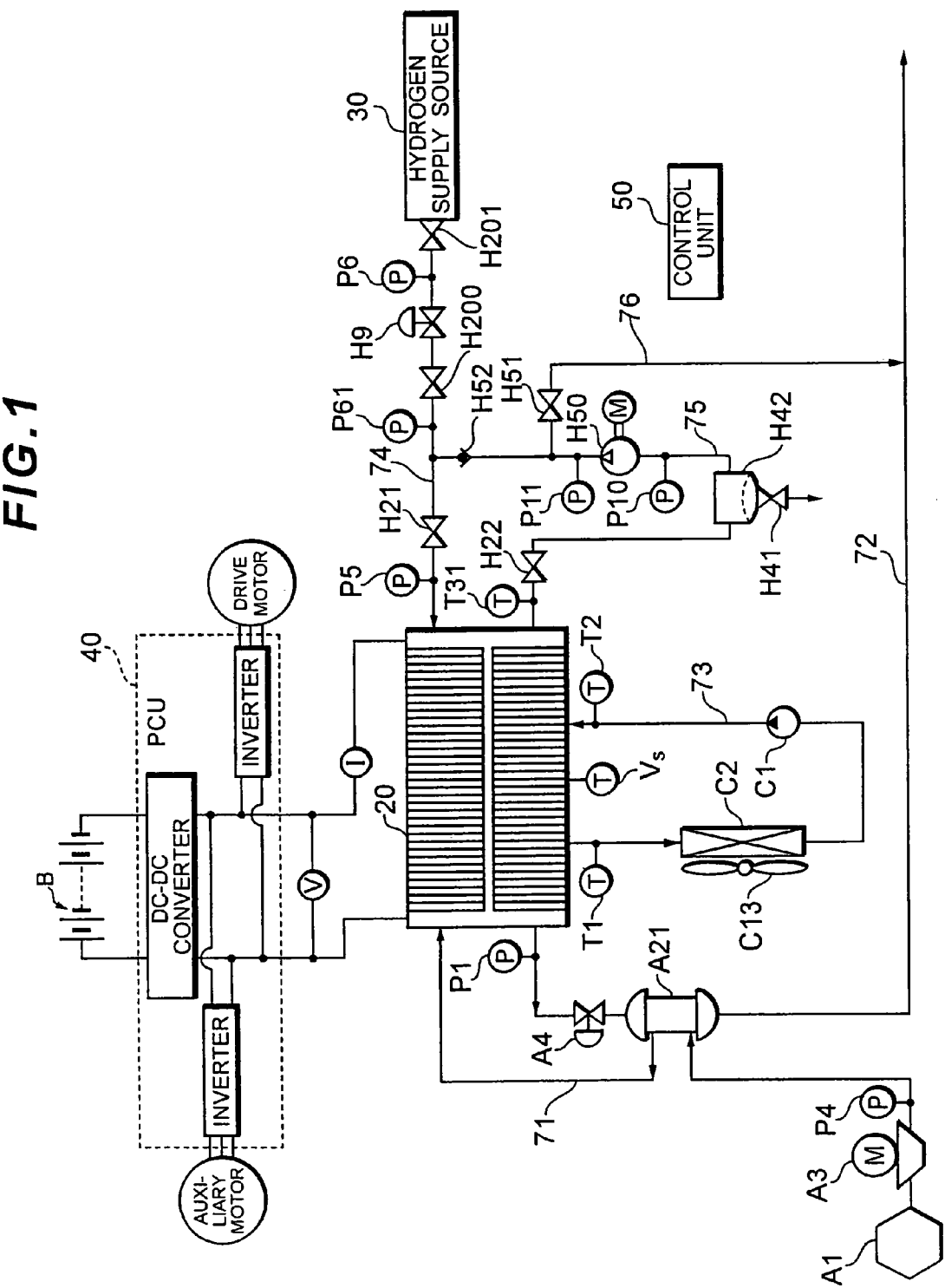
FIG. 1 is a block diagram that explains a fuel cell system according to a first embodiment of the present invention.

FIG. 1 shows an example of a fuel cell system that is an application of the first embodiment of the present invention.

As shown in the figure, air (external air) is supplied as the oxidizing gas to an air supply port of a fuel cell 20 through an air supply path 71. An air filter A1 that removes fine particles from the air, a compressor A3 that pressurizes the air, a pressure sensor P4 that measures the supply air pressure, and a humidifier A21 that adds the required moisture to the air are provided on the air supply path 71. The compressor A3 is driven by an auxiliary motor that is described later, and together with a control program of a control unit 50 form scavenging means. An air flow meter (flow meter) is provided in the air filter A1 to measure the air flow rate.

Air offgas discharged from the fuel cell 20 is emitted to the outside via an air offgas discharge path 72. A pressure sensor P1 that measures the discharge pressure, a pressure adjustment valve A4, and the heat exchanger of the humidifier A21 are provided on the discharge path 72. The pressure sensor P1 is provided close to an air discharge port of the fuel cell 20. The pressure adjustment valve (regulator) A4 functions as a regulator to set the supply air pressure (air pressure) to the fuel cell 20. Measurement signals not shown in the drawings from the pressure sensors P4 and P1 are sent to the control unit 50. The control unit 50 sets the supply air pressure and supply air flow rate to the fuel cell 20 by adjusting the compressor A3 and pressure adjustment valve A4.

Hydrogen gas is supplied as the fuel gas to a hydrogen supply port of the fuel cell 20 from a hydrogen supply source 30 through a fuel supply path 74. The hydrogen supply source 30 is for example a high pressure hydrogen tank, but a reformer or a hydrogen absorbing alloy may be used. A shutoff valve (hydrogen supply valve) H201 that supplies or shuts off the supply of hydrogen from the hydrogen supply source 30, a pressure sensor P6 that measures the hydrogen gas supply pressure from the hydrogen supply source 30, a hydrogen pressure adjustment valve H9 that reduces and adjusts the supply pressure of hydrogen gas to the fuel cell 20, an on-off valve (degree of opening adjustment valve) H200 whose degree of opening can be varied and that is operated by a degree of opening adjustment signal from the control unit 50, a pressure sensor P61 that measures the pressure of the hydrogen gas downstream of the degree of opening adjustment valve H200, a shutoff valve (FC inlet valve) H21 that opens or closes between the hydrogen supply port of the fuel cell 20 and the fuel supply path 74, and a pressure sensor P5 that measures the pressure of hydrogen gas at the inlet to the fuel cell 20 are provided on the fuel supply path 74. For example, a mechanical type regulator that reduces pressure can be used as the pressure adjustment valve H9. An example of pressure adjustment valve H9 is a diaphragm type regulator. Also, for example a solenoid on-off valve that is controlled by a pulse width modulation (PWM) drive signal (degree of opening adjustment signal) to open and close can be used as the degree of opening adjustment valve H200. Also, a valve whose degree of opening is adjusted linearly (or continuously) by a pulse motor may be used. Control pressure sensor P5 corresponds to gas pressure measurement means. Measurement signals not shown in the drawings from pressure sensors P5 and P6 are supplied to the control unit 50. It is desirable that the pressure adjustment valve A4, the shutoff valve H201, the FC inlet valve H21, and the later to be described FC exit valve H22, discharge water valve H41, and purge valve H51 are solenoid valves.

Hydrogen gas that is not consumed in the fuel cell 20 is discharged as hydrogen offgas to a hydrogen circulation path 75, and is returned to the fuel supply path 74 on the downstream side of the degree of opening adjustment valve H200. A temperature sensor T31 that measures the temperature of the hydrogen offgas, the shutoff valve (FC exit valve) H22 that discharges the hydrogen offgas, an air-liquid separator H42 that recovers moisture from the hydrogen offgas, the discharge valve H41 that delivers the recovered water to a tank not shown in the drawings, a hydrogen pump H50 that pressurizes the hydrogen offgas, and a backflow prevention valve H52 are provided on the hydrogen circulation path 75. The shutoff valves H21 and H22 correspond to closure means that close the anode side of the fuel cell. The measurement signal not shown in the drawings of the temperature sensor T31 is supplied to the control unit 50. The operation of the hydrogen pump H50 is controlled by the control unit 50. The hydrogen offgas is merged with the hydrogen gas in the fuel supply path 74 where it is supplied to the fuel cell 20 and reused. The backflow prevention valve H52 prevents the hydrogen gas in the fuel supply path 74 from flowing back into the hydrogen circulation path 75 side.

The hydrogen circulation path 75 is connected to the discharge path 72 by a purge flow path 76 via the purge valve H51. The purge valve H51 is a solenoid type shutoff valve, that is operated by instructions from the control unit 50 to discharge hydrogen offgas to the outside (purge). By intermittently carrying out this purge, reduction of the cell voltage due to increase in the concentration of impurities in the hydrogen gas on the fuel electrode side due to repeated circulation of hydrogen offgas can be prevented.

Furthermore, a cooling path 73 is provided to circulate cooling water to the cooling water inlet and outlet of the fuel cell 20. A temperature sensor T1 that measures the temperature of cooling water discharged from the fuel cell 20, a radiator (heat exchanger) C2 that dissipates heat of the cooling water to the outside, a pump C1 that circulates cooling water under pressure, and a temperature sensor T2 that measures the temperature of cooling water supplied to the fuel cell 20 are provided on the cooling path 73. The radiator C2 is provided with an auxiliary motor C13 that drives the rotation of a cooling fan.

The fuel cell 20 includes a fuel cell stack with the required number of laminations of fuel cell cells. The output voltage of each fuel cell or cell group measured by a voltage sensor Vs is sent to the control unit 50. The electrical power generated by the fuel cell 20 is supplied to a power control unit 40. The power control unit 40 includes an inverter not shown in the drawings that drives the motor that drives a vehicle, inverters that drive compressor motors and many types of auxiliary equipment, a DC-DC converter that charges a secondary battery B or supplies power from the secondary battery to motors, or the like.

The control unit 50 receives required loads such as signals from the accelerator pedal of the vehicle not shown in the drawings, and control information from sensors in all parts of the fuel cell system, and controls the operation of all types of valves and motors. The control unit 50 is formed from a control computer system not shown in the drawings. The control computer system may be formed from a commonly known and available system.

Next, an example of operation of the control unit 50 will be explained. In this embodiment the pressure (or supply flow rate) of the hydrogen gas supplied to the fuel cell 20 is controlled by the pressure adjustment valve H9 and the degree of opening adjustment valve H200 downstream of it. The control unit 50 controls the reduction of pressure of the high pressure hydrogen gas from the high pressure hydrogen tank as hydrogen supply source to a predetermined pressure level by the pressure adjustment valve H9, and then controls the opening time (or duty ratio) so that the pressure becomes the control target pressure at that time by the degree of opening adjustment valve H200, taking into consideration the fuel cell power generation, hydrogen consumption, purge amount, and pressure adjustment-characteristics (H9). Also, to detect defective pressure adjustment characteristics, the degree of opening adjustment valve H200 is opened for a short time under no load and no purge conditions and the pressure rise is monitored, to detect a defective seal between the degree of opening adjustment valve H200 and the pressure adjustment valve H9. The opening time of the degree of opening adjustment valve is corrected for the amount of seal defect. Furthermore, if the seal defect exceeds a predetermined value, operation (generation) of the fuel cell system is stopped.

Figure 12:
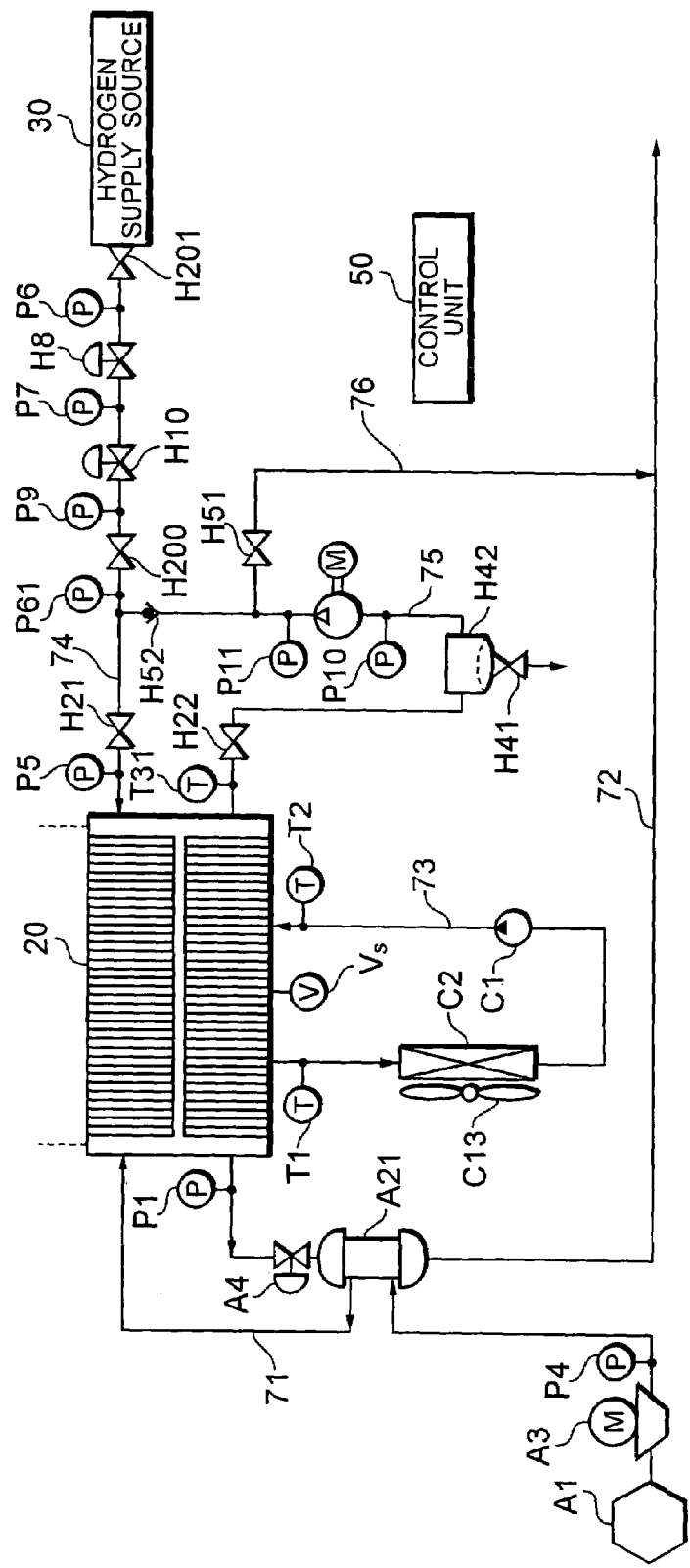
FIG. 12 is a block diagram explaining a fuel cell system (using a back pressure regulating valve) according to a third embodiment of the present invention.
Figure 13:
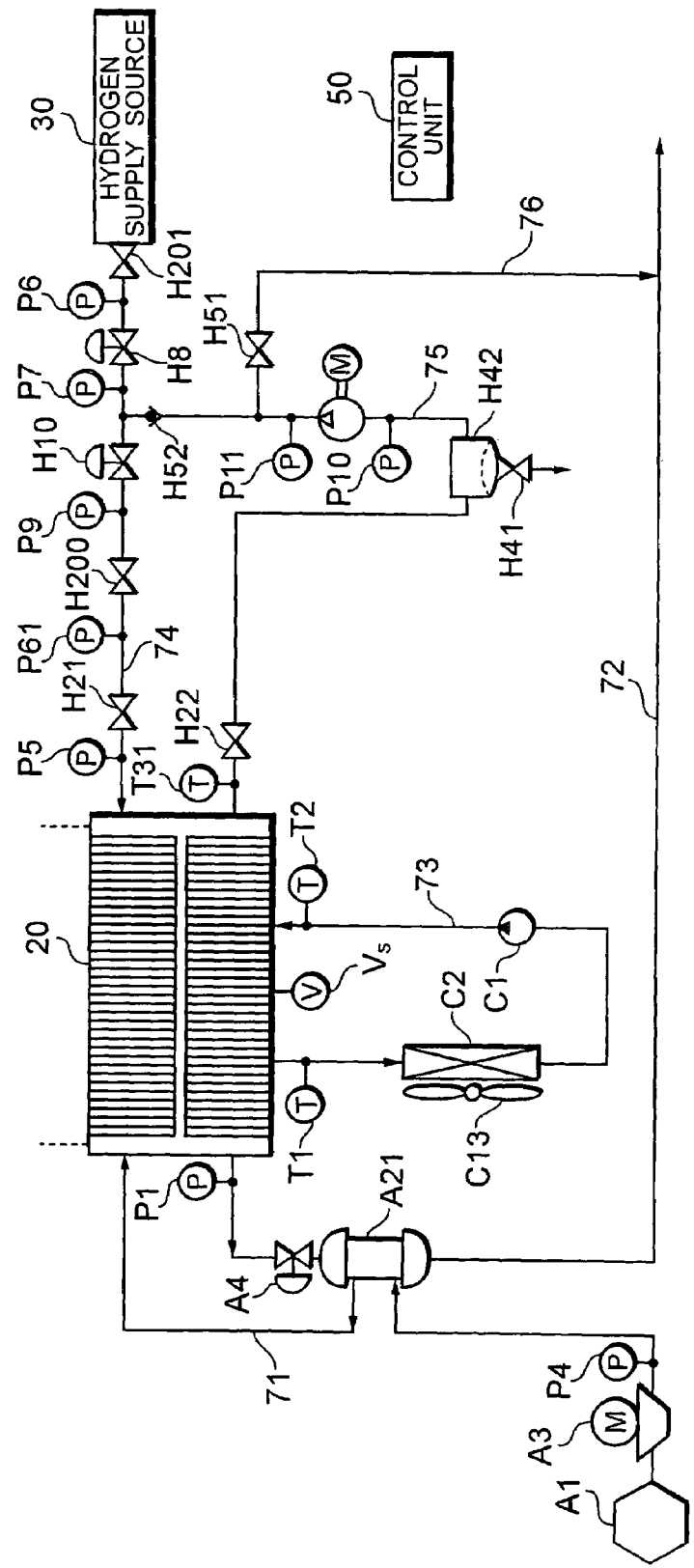
FIG. 13 is a block diagram explaining a fuel cell system (using a back pressure regulating valve, with hydrogen gas circulation upstream of the back pressure regulating valve) according to a fourth embodiment of the present invention.

Also, it is desirable that the control unit 50 carries out control taking into consideration individual differences in each degree of opening valve H200, such as initial deviations due to variations in manufacture of the degree of opening adjustment valve H200 or deterioration with time, for example minor leaks within the allowable range in the closed state of the degree of opening adjustment valve H200, deviations between the instructed value of valve opening of the degree of opening adjustment signal and the actual valve degree of opening (valve degree of opening instructed value Vs valve degree of opening characteristics), or the like. Therefore, during manufacturing shipment or periodic inspection, or during operation of the fuel cell system, many types of characteristics of the degree of opening adjustment valve H200 are measured, and the initial deviation (deviation from the design value) is recorded in involatile memory. These measurements are carried out with a pressure sensor P9 and the pressure sensor P61 arranged upstream and downstream of the degree of opening adjustment valve H200 respectively, as shown in FIGS. 12 and 13. By using control parameters (corrected values) corrected for the initial deviations or by using valve degree of opening instruction values corrected for the initial deviations, account can be taken of the individual differences (variations) in degree of opening adjustment valves H200 so the control accuracy can be improved. Also, the proportion of good degree of opening valves H200 can be relatively improved. Furthermore, during operation of a fuel cell system or a vehicle in which a fuel cell is installed, or during periodic inspection, by measuring the degree of opening adjustment valve H200 many kinds of deviation can be detected. By updating the recorded initial deviations it is possible to take account of the variation with time of the characteristics of the degree of opening adjustment valve H200.

In the first embodiment shown in FIG. 1, the pressure sensor P9 is not provided between the pressure adjustment valve H9 and the degree of opening adjustment valve H200 so that the various characteristics of the degree of opening adjustment valve H200 can be measured during manufacturing shipment or during periodic inspection, however as shown in FIGS. 12 and 13, a pressure sensor P9 can be provided. For example, when the fuel cell system is operating with the degree of opening adjustment valve H200 incorporated into the fuel cell system, it is possible to measure the characteristics of the degree of opening adjustment valve H200 under appropriate conditions, and determine the deviation from the design values (or standard values), and use the deviations to correct the operation control in the same way as above.

The control unit 50 includes a control computer as stated above, and executes control of all parts of the fuel cell system in accordance with control programs.

Figure 2:
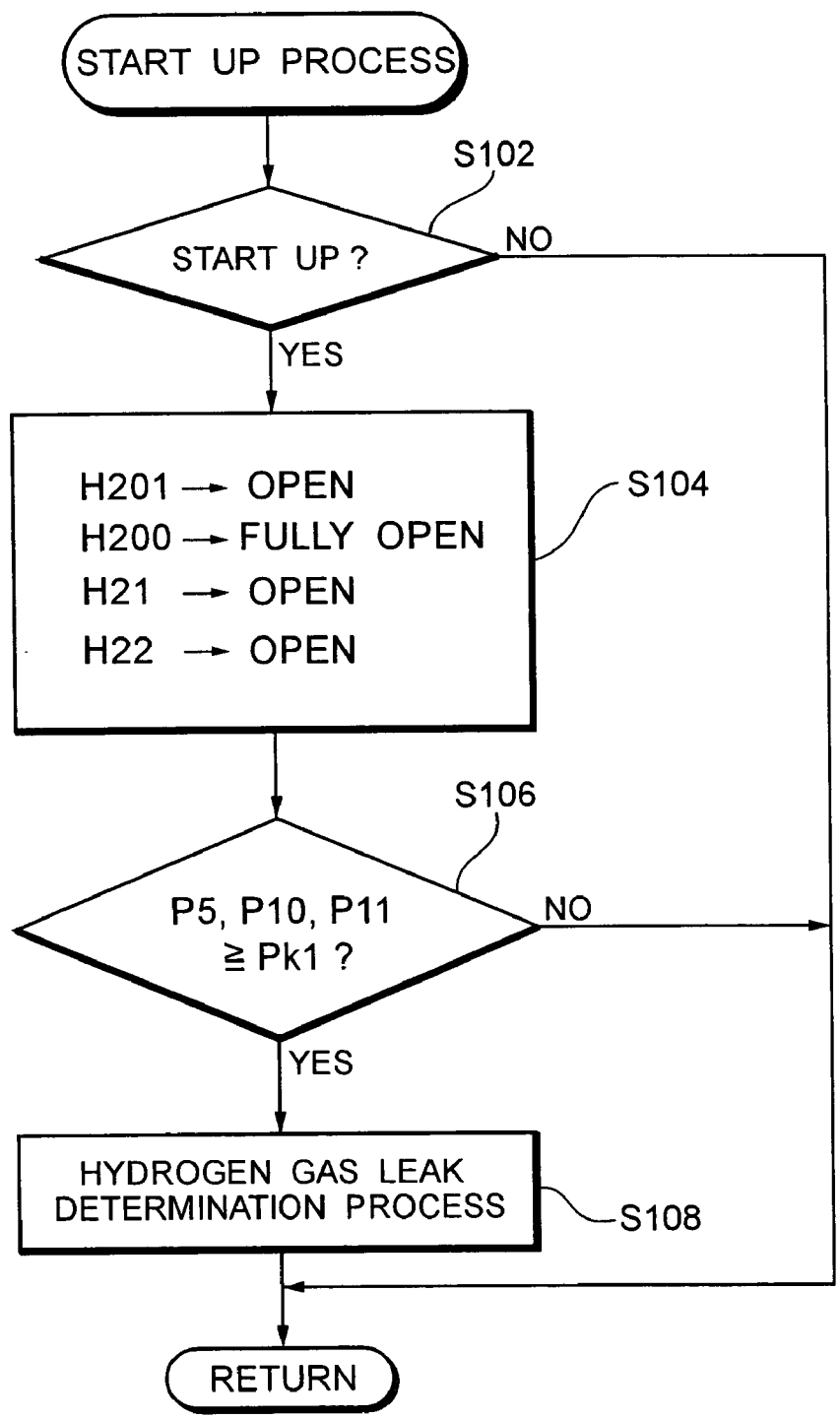
FIG. 2 is a flowchart explaining the startup of a fuel cell according to the present embodiment.

First start up of the fuel cell system will be explained with reference to FIG. 2. Operation of the control unit 50 starts when power is supplied to a control system not shown in the drawings, and the control unit 50 monitors whether a start up instruction has been issued by operation of the vehicle start key. For example, when the start up instruction is issued by operation of the start key or similar, a start up flag (event flag) is set in an area of the memory set in advance (S102).

When a start up instruction is issued (S102; YES), the shutoff valves H201, H21, and H22 on the fuel supply path 74 and the hydrogen circulation path 75 are opened, and the degree of opening adjustment valve H200 is fully opened. By opening the degree of opening adjustment valve H200 fully, the hydrogen supply and pressure required at start up is provided to the supply paths (piping) and fuel cell stack in a short period of time (S104).

The pressure sensor P5 and pressure sensors P10 and P11 on the fuel supply path and the hydrogen gas circulation path are periodically monitored, to determine whether the hydrogen gas pressure in each path exceeds a pressurization completion standard value Pk1 or not (S106). If it is not exceeded monitoring continues (S106; NO). If it is exceeded (S106; YES) a flag is set to carry out a hydrogen leak determination process to determine whether there is a hydrogen leak (S108).

Figure 3:
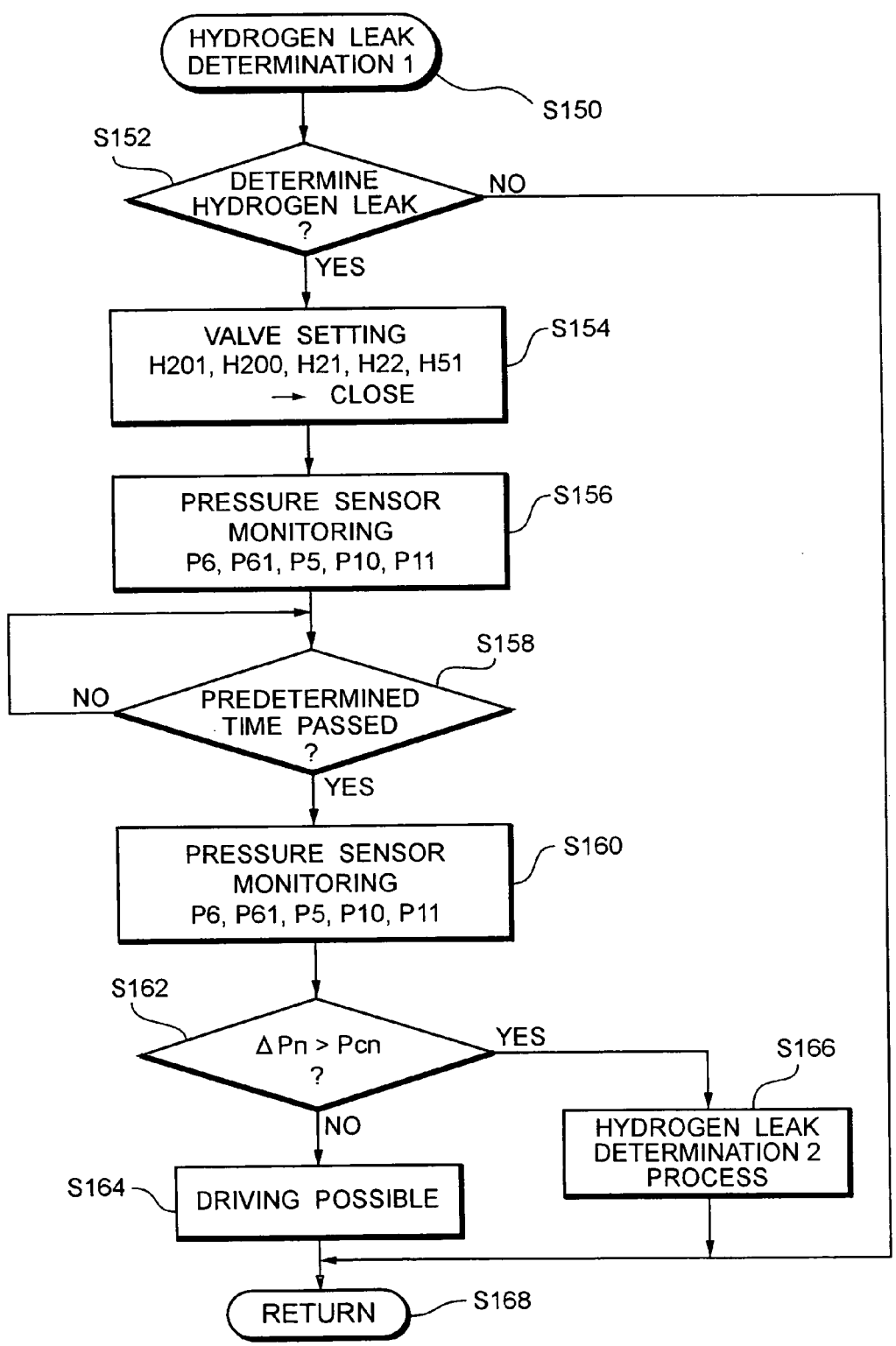
FIG. 3 is a flowchart explaining the determination of a hydrogen leak in a fuel cell according to the present embodiment.

FIG. 3 is a flowchart explaining the first hydrogen leak determination (S150). Hydrogen leakage can be determined from the degree of variation (change margin) in the reduction in pressure of the hydrogen gas enclosed in the piping in a predetermined period of time.

The control unit checks the status of the hydrogen leak determination flag at periodic intervals or at the occurrence of an event. If the determination flag is not set to ON the procedure returns to the main routine (S152; NO). If the determination flag is set to ON (S150; YES), the first hydrogen leak determination process is carried out.

First, as a result of the process in step S104, hydrogen gas is supplied to the fuel supply path 74, the fuel cell 20, and the hydrogen gas circulation path 75. The control unit 50 shuts the shutoff valve H201, the degree of opening adjustment valve H200, the shutoff valve H21, the shutoff valve H22, and the purge valve H51, to form enclosed areas in the fuel supply path and the hydrogen gas circulation path, cut , off by the valves (S154). The control unit 50 monitors the hydrogen gas pressure in each area. In other words, the gas pressure $P6_1$ in the area enclosed by the shutoff valve H201 and the pressure adjustment valve H9 is measured by the pressure sensor P6. The gas pressure $P61_1$ in the area enclosed by the degree of opening adjustment valve H200 and the shutoff valve H21 is measured by the pressure sensor P61. The gas pressure $P5_1$ in the fuel cell (stack part) enclosed by the shutoff valve H21 and the shutoff valve H22 is measured by the pressure sensor P5. The gas pressures $P10_1$ and $P11_1$ in the area enclosed by the shutoff valve H22 and the backflow prevention valve H52 is measured by the pressure sensors P10 and P11. Note that the purge valve H51 is closed. The control unit 50 reads and records the value of gas pressure of each sensor, $P6_1$, $P61_1$, $P5_1$, $P10_1$, and $P11_1$ ($P6_1$ to $P11_1$) (S156). The control unit 50 waits until a predetermined period of time has passed (S158; NO). When the predetermined period of time has passed (S158; YES), the control unit 50 again monitors and reads the hydrogen gas pressure in each area. In other words, the gas pressure $P6_2$ in the area enclosed by the shutoff valve H201 and the pressure adjustment valve H9 is measured by the pressure sensor P6. The gas pressure $P61_2$ in the area enclosed by the degree of opening adjustment valve H200 and the shutoff valve H21 is measured by the pressure sensor P61. The gas pressure $P5_2$ in the fuel cell (stack part) enclosed by the shutoff valve H21 and the shutoff valve H22 is measured by the pressure sensor P5. The gas pressures $P10_2$ and $P11_2$ in the area enclosed by the shutoff valve H22 and the backflow prevention valve H52 is measured by the pressure sensors P10 and P11. The control unit 50 reads and records the value of gas pressure of each sensor, P6$_2$, P61$_2$, P5$_2$, P10$_2$, and P11$_2$ (P6$_2$ to P11$_2$) (S160). For each area the difference in pressure ΔPn (=ΔP6 to ΔP11) between the previous values of hydrogen gas pressure Pn$_1$ (=P6$_1$ to P11$_1$) and the present values Pn$_2$ (=P6$_2$ to P11$_2$) is obtained, to obtain the variation in gas pressure in each area (ΔP6 to ΔP11). For each of these areas it is determined whether the pressure variations exceed the respective predetermined criterion values Pc$_n$ (=Pcn$_1$, Pcn$_2$, ... Pcn$_5$) (S162).

If the pressure variation in each of the areas do not exceed the criterion value set for the respective areas (S162; NO), it is determined that there is no hydrogen leak and the drive flag is set to ON (S164), and the procedure returns to the main routine (S168).

On the other hand, if the pressure variation in any of the areas exceeds the criterion for the area (S162; YES), it is determined that there is possibly a hydrogen leak, and the second hydrogen leak determination is carried out (S166). For example, threshold values (standard values) for hydrogen leak determination can be set as high and low in two stages, so if a leak is detected using the low determination value, the pressure can be increased again and the determination repeated. In this way, minute leaks can be detected.

Figure 4:
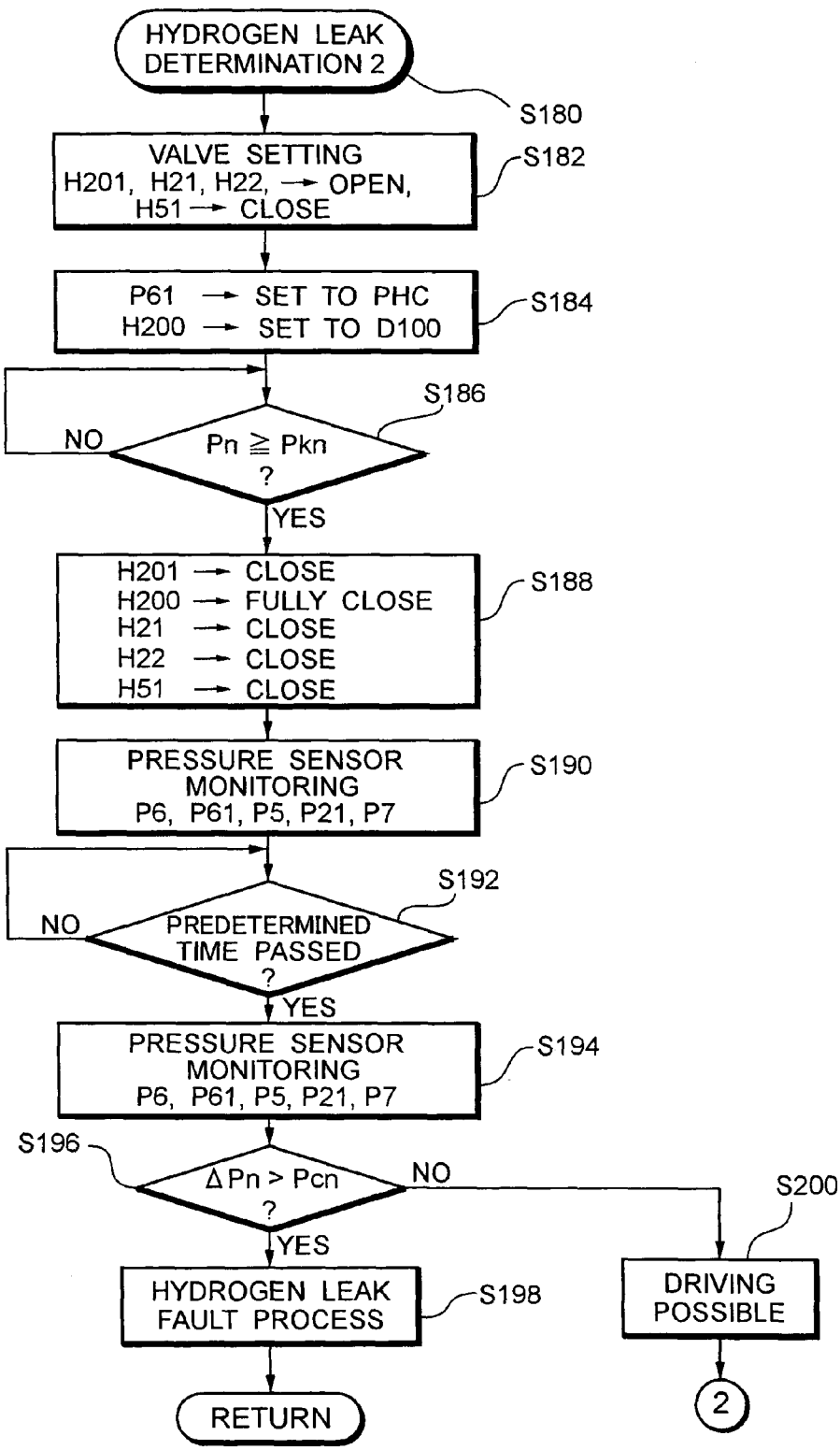
FIG. 4 is a flowchart explaining the second determination of a hydrogen leak in a fuel cell according to the present embodiment.

FIG. 4 is a flowchart explaining the second hydrogen leak determination process.

The control unit 50 opens the shutoff valve H201, the shutoff valves H21 and H22, and closes the purge valve H51 (S182). In this way hydrogen gas whose pressure has been reduced by the pressure adjustment valve H9 is applied to the degree of opening adjustment valve H200.

The gas pressure (pressure sensor P61) in the area from the degree of opening adjustment valve H200 to the on-off valve H21 is set to the target value Phc, an instruction value D100 that will apply a degree of opening to the degree of opening adjustment valve H200 corresponding to the target pressure Phc, and the degree of opening adjustment valve H200 is operated. The value of the pressure sensor P61 is monitored, and the degree of opening adjustment valve H200 is controlled so that the gas pressure in that area is equal to Phc (S184). In this way, the hydrogen gas pressure within the fuel supply path 74, the stack of the fuel cell 20, and the hydrogen circulation path 75 is increased. The pressure sensors P5, P10, and P11 on the fuel supply path and the hydrogen gas circulation path are monitored, and it is determined whether the hydrogen gas pressure in each flow path is equal to or greater than the pressurization completion criterion values Pkn (=Pkn$_1$, Pkn$_2$, Pkn$_3$) set for each respective area (S186). If the criterion values are not reached, the procedure waits until the gas pressure in the flow paths exceeds the criterion values Pkn (S186; NO). If the gas pressure in each flow path is equal to or greater than each criterion value (S186; YES), next the control unit 50 closes the hydrogen supply valve H201, the degree of opening adjustment valve H200, the shutoff valve H21 on the inlet side of the fuel cell 20, the shutoff valve H22 on the outlet side of the fuel cell 20, and the relief valve H51 (S188).

Next, the control unit 50 reads and records the gas pressure values P6$_3$, P61$_3$, P5$_3$, P10$_3$, and P11$_3$ (P6$_3$ to P11$_3$) of the pressure sensors P6, P61, P5, P10, and P11 (S190). The control unit 50 waits for a predetermined period of time to pass (S192; NO). When the predetermined period of time has passed (S192; YES) the control unit 50 again monitors each area and reads the hydrogen gas pressures., In other words, the gas pressure P6$_4$ in the area (piping) enclosed by the shutoff valve H201 and the pressure adjustment valve H9 is measured by the pressure sensor P6. The gas pressure P61$_4$ in the area enclosed by the degree of opening adjustment valve H200 and the shutoff valve H21 is measured by the pressure sensor P61. The gas pressure P5$_4$ in the fuel cell (stack part) enclosed by the shutoff valve H21 and the shutoff valve H22 is measured by the pressure sensor P5. The gas pressures P10$_4$ and P11$_4$ in the area enclosed by the shutoff valve H22 and the backflow prevention valve H52 is measured by the pressure sensors P10 and P11. The control unit 50 reads and records the value of gas pressure of each sensor, P6$_4$, P61$_4$, P5$_4$, P10$_4$, and P11$_4$ (P6$_4$ to P11$_4$) (S194). For each area the difference in pressure ΔPn (=ΔP6 to ΔP11) between the previous values of hydrogen gas pressure Pn$_3$ (=P6$_3$ to P11$_3$) and the present values Pn$_4$ (=P6$_4$ to P11$_4$) is obtained, to obtain the variation in gas pressure in each area (ΔP6 to ΔP11). For each of these areas it is determined whether the pressure variations exceed the respective predetermined criterion values Pc$_n$ (=Pcn$_1$, Pcn$_2$, ... Pcn$_5$) (S196).

As a result, if any of the pressure variations exceed the criteria (S196; YES), it is determined that there is a possibility of a hydrogen leak, and the hydrogen leak process is carried out. The hydrogen leak process can include for example, drawing the attention of the driver by an alarm, displaying a warning on a screen, or the like, automatically warning the service station, turning off the vehicle, stopping the supply of hydrogen gas from the hydrogen source 360, and so on (S198).

If the pressure variations do not exceed the criterion values (S196; NO), it is determined that there is no hydrogen leak, and the vehicle can be driven, and the drive flag is set to ON (S200).

Figure 5:
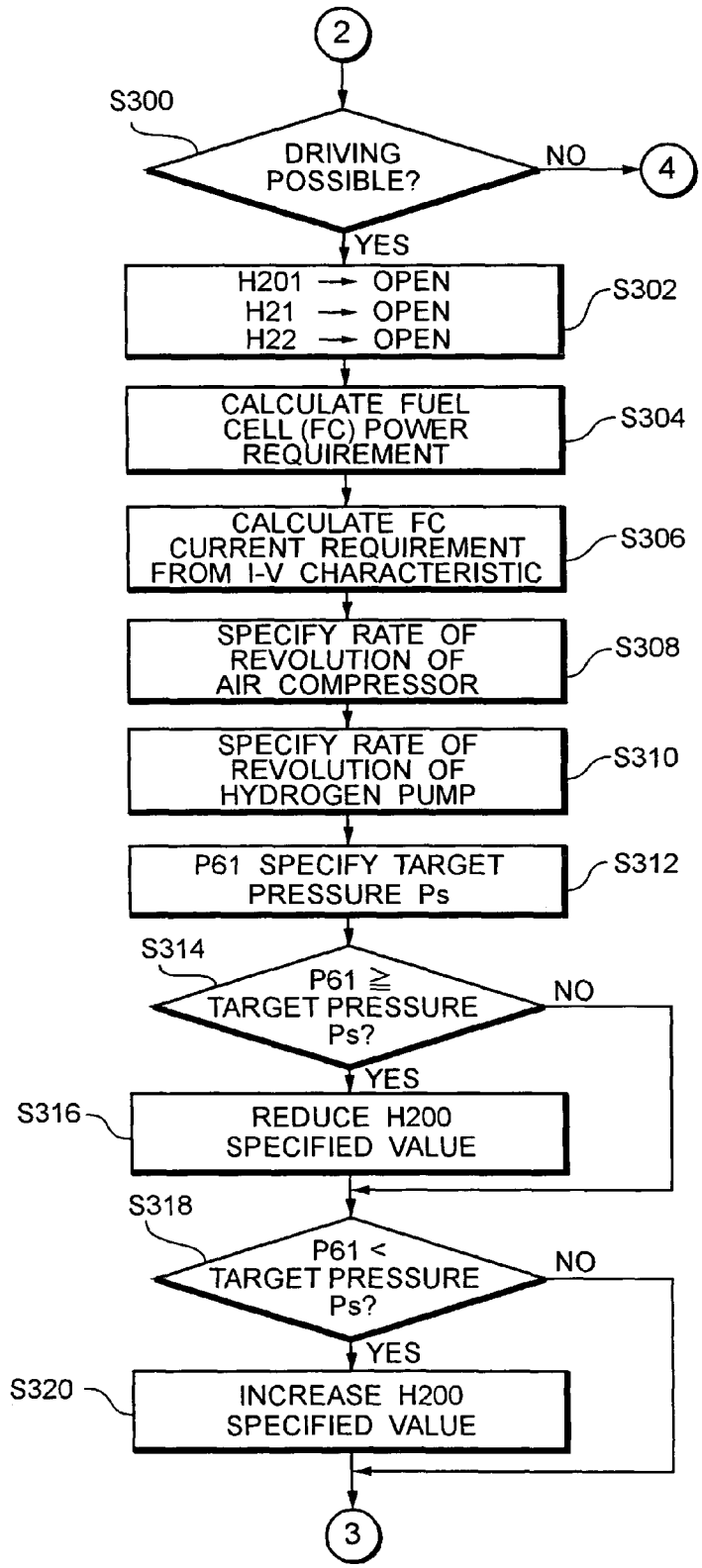
FIG. 5 is a flowchart explaining the setting of the hydrogen gas supply rate in the present embodiment.
Figure 6:
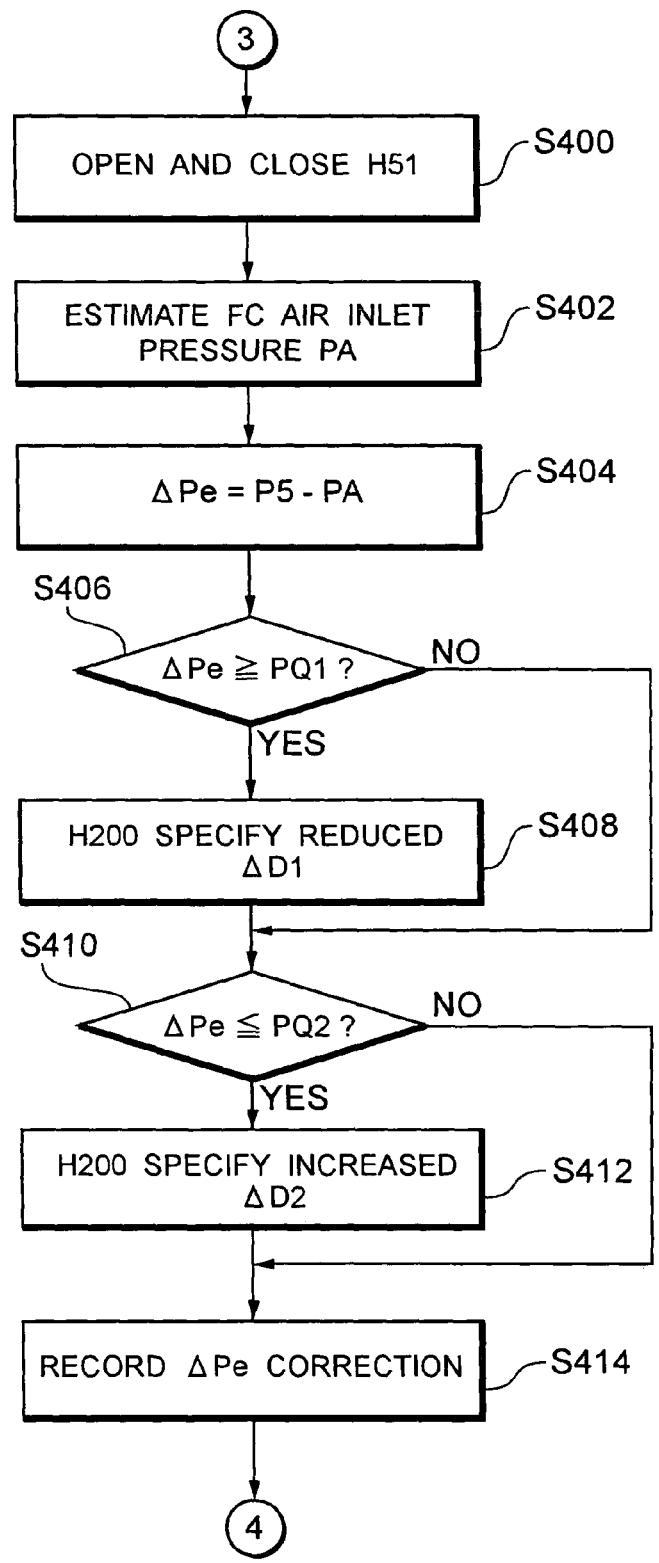
FIG. 6 is a flowchart explaining the adjustment of the difference in pressure between the electrodes.
Figure 7:
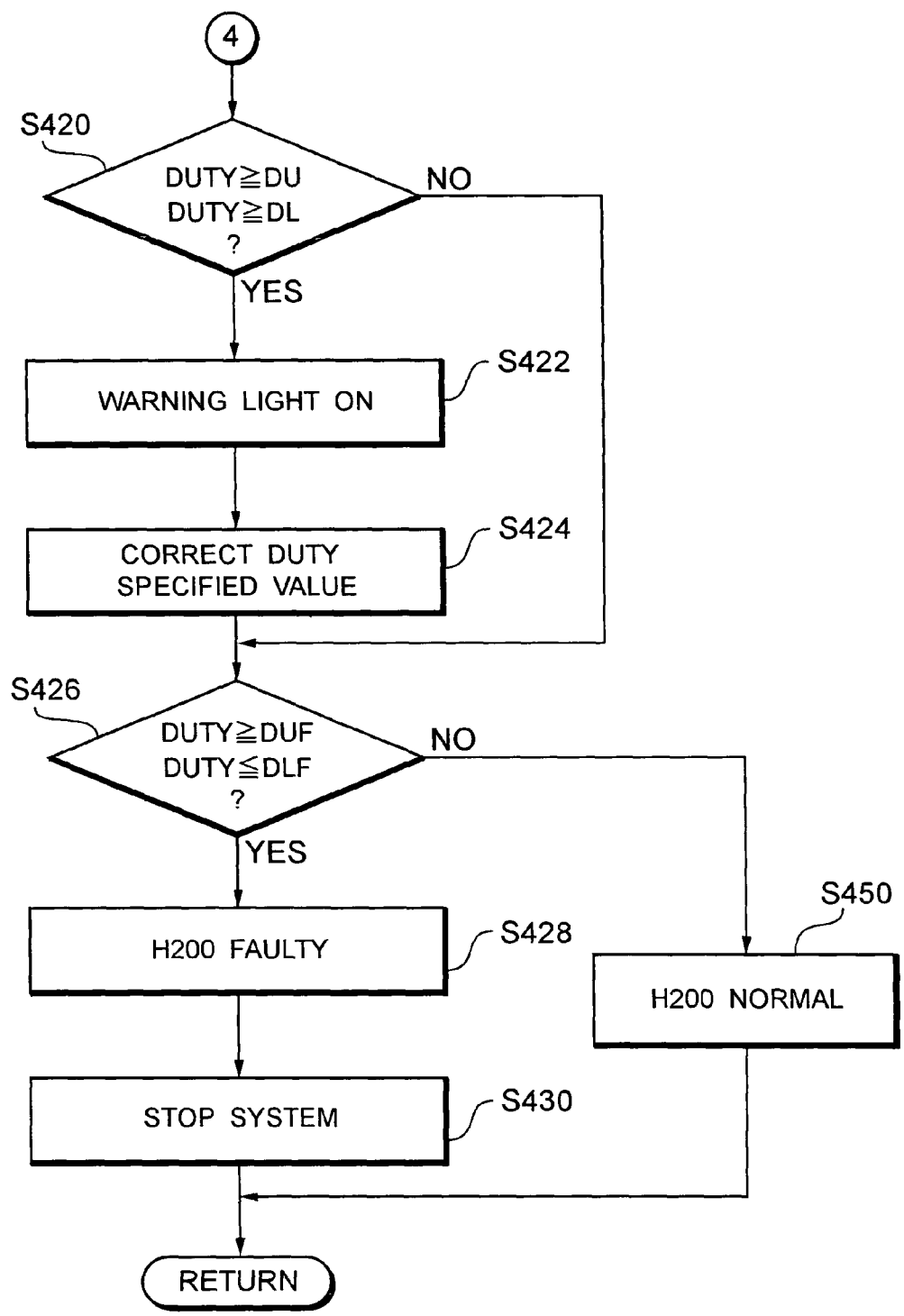
FIG. 7 is a flowchart explaining the determination of a fault in the degree of opening adjustment valve in the present embodiment.

As shown in FIG. 5, the control unit 50 determines whether the above flag for no hydrogen leak and flags for other conditions that allow driving have been set to ON (S300). If it is determined that driving is allowed (S300; YES), the control unit 50 carries out the following operation to supply the required hydrogen gas. First, the shutoff valves H201, H21, and H22 on the fuel supply path and the hydrogen gas circulation path are opened so that supply of hydrogen gas from the hydrogen gas source 30 to the fuel cell 20 is possible (S302). In order to determine the hydrogen gas supply flow rate, the control unit 50 for example calculates the generation power P (=VI) required of the fuel cell for the amount that the accelerator pedal is pressed and to drive the required loads, using a predetermined calculation formula or map data (S304). From the predetermined I (output current)–V (output current) characteristics of the fuel cell 20 the output current I required of the fuel cell 20 is calculated (S306). When the required fuel cell 20 current is calculated, the corresponding rate of revolution of the air compressor A1 is set taking the stoiciometry of hydrogen into account (S308), and the corresponding rate of revolution of the hydrogen pump H50 is set (S310). Besides the rate of revolution of the hydrogen pump H50, the hydrogen gas flow rate varies with the inlet pressure to the hydrogen pump H50, so the rate of revolution of the hydrogen pump H50 is set using a two-dimensional map of for example output of the pressure sensor P61 and the output current I.

The control unit 50 sets the target pressure for the hydrogen gas pressure in the supply path between the degree of opening adjustment valve H200 and the shutoff valve H21 (S312). The actual hydrogen gas pressure in the path is read from the output of the pressure sensor P61, and compared with the target pressure (S314). If the output of the pressure sensor P61 exceeds the target pressure (S314; YES), an instruction to reduce the degree of opening of the degree of opening adjustment valve H200 is issued, to adjust the pressure to the target pressure (S316). After adjusting the degree of opening of the valve, or if the output of the pressure sensor P61 does not exceed the target pressure (S314; NO), it is determined whether the output of the pressure sensor P61 is equal to or less than the target pressure (S318). If the output of the pressure sensor P61 is equal to or less than the target pressure (S318; YES), an instruction is issued to increase the degree of opening of the degree of opening adjustment valve H200 to adjust the pressure to equal the target pressure (S320). In this way, the output of the pressure sensor P61 is adjusted to be equal to the target pressure.

Next, when necessary or when specific conditions are fulfilled, the degree of opening of the purge valve H51 is adjusted to replace the hydrogen gas, to prevent a reduction in the cell voltage of the fuel cell 20 due to an increase in nitrogen gas or other impurities. For example, to control the purge valve H51, for each predetermined time of a timer corresponding to the operation time of the fuel cell 20, a timeout output (increment value) is summed, and when the summation value exceeds a predetermined number the purge valve H51 is opened. At the same time the summation value is cleared to zero, and summation starts again. The fuel cell 20 output current versus valve opening time is mapped and recorded in advance, so it is possible to set the valve opening time of the purge valve H51 by reading the map. The above increment value can be corrected for temperature using for example a two-dimensional table of fuel cell 20 temperature and output current mapped in advance. For example, at low temperatures the closed time of the purge valve H51 tends to be relatively short, and the exhaust frequency increases. In this way, compensation for reduction in output of the fuel cell 20 at low temperatures is carried out (S400).

Next, the control unit 50 carries out an adjustment so that the pressure difference between electrodes of the cells of the fuel cell is within a predetermined range. First, the air pressure at the air supply port of the fuel cell 20 is calculated from the output of the air flow meter A1 at the air intake, by deducting the losses in the flow path 71 that are known in advance, to estimate the inlet pressure PA (S402). The control unit 50 reads the pressure P5 of the hydrogen supply port from the output of the pressure sensor P5, and calculates the pressure difference between electrodes $\Delta Pe$ from the difference of the pressure P5 and the air supply port pressure PA (S404). Here the pressure difference between electrodes $\Delta Pe$ can be a positive or negative value depending upon the relationship of magnitude of the air pressure and hydrogen gas pressure. If the pressure difference between electrodes $\Delta Pe$ is larger than a predetermined upper limit criterion value PQ1 (S406; YES), the degree of opening of the degree of opening adjustment valve H200 is reduced by $\Delta D1$ corresponding to the deviation. As a result, the gas pressure of hydrogen supplied to the inlet of the fuel cell 20 is reduced (S408). If the pressure difference between electrodes $\Delta Pe$ is smaller than the criterion value PQ1 (S406; NO), and after adjusting the supply hydrogen pressure (S408), the pressure difference between electrodes $\Delta Pe$ is again calculated from the difference of the hydrogen supply port pressure P5 and the air supply port pressure PA, and it is determined whether the pressure difference $\Delta Pe$ is smaller than the lower limit criterion value PQ2 (s410). If the pressure difference between electrodes $\Delta Pe$ is smaller than the criterion value PQ2, the degree of opening of the degree of opening adjustment valve H200 is increased by $\Delta D2$ corresponding to the deviation (S412). If the pressure difference between electrodes $\Delta Pe$ is not smaller than the criterion value PQ2 (S410; NO) or after adjusting the degree of opening of the degree of opening adjustment valve H200 (S412), the pressure difference between electrodes $\Delta Pe$ is within the predetermined limits, and the degree of opening adjustment value of the degree of opening adjustment valve H200 (correction value for the valve characteristics) is recorded (S414).

In this way, if the pressure difference between electrodes $\Delta Pe$ is large, then if the supply hydrogen gas pressure is high relative to the supply air pressure the control unit 50 reduces the supply hydrogen pressure, and if the supply hydrogen gas pressure is low relative to the supply air pressure the control unit 50 increases the supply hydrogen pressure, to adjust the pressure difference between electrodes $\Delta Pe$ to be smaller (pressure difference to be within the predetermined range). The reason for adjusting the gas pressure on the hydrogen gas side is because reducing the supply air pressure on the air electrode side (cathode) tends to worsen the output current value versus output voltage characteristic of the fuel cell 20.

Next the control unit 50 determines whether there is a fault in the degree of opening adjustment valve H200 (S420). As stated above, the degree of opening of the degree of opening adjustment valve H200 is set with respect to the supply hydrogen gas pressure (target pressure) to the fuel cell 20 and the above pressure difference adjustment (correction), but if this valve degree of opening is not within the normally used first predetermined range (upper limit value DU, lower limit value DL) (S420; YES), a warning is displayed on the vehicle dashboard or another location that the user can easily notice. The warning can be a lamp lighting up, displaying a warning image, sound, or the like. (S422).

Next, the control unit 50 corrects the degree of opening instruction value for the signal applied to the degree of opening adjustment valve H200 so that the degree of opening of the degree of opening adjustment valve H200 is within the predetermined range (S424).

Furthermore, the control unit 50 determines whether the degree of opening of the degree of opening adjustment valve H200 is within the second predetermined range (upper limit value DUF, lower limit value DLF) which is broader than the first predetermined range (upper limit value DU, lower limit value DL). Here the values for determination are in the order DLF<DL<DU<DUF. If the degree of opening of the degree of opening adjustment valve H200 is also not within the second range (S426; YES), it is determined that the degree of opening adjustment valve H200 is faulty. Furthermore, the control unit 50 sets a degree of opening adjustment valve H200 fault flag on an internal register not shown in the drawings, displays fault warnings and other warnings (S428), carries out the fuel cell system stopping process that stops the supply of hydrogen gas and air to the fuel cell 20 and stops operation (S430), and returns to the main control program.

When the degree of opening of the degree of opening adjustment valve H200 is within the first range (S420; NO), or when as a result of correction (S424) it is within the second range (S426; NO), it is determined that the degree of opening adjustment valve is normal, and a degree of opening adjustment valve H200 normal flag is set on an internal register shown in the drawings (S450). Control returns to the main control program, and the fuel cell 20 can be operated.

Next, pulsed operation of the fuel cell 20 is explained. Water is produced as a result of power generation by the fuel cell 20, and if this water accumulates within the fuel cell stack gas supply will be hindered and the power generation of the fuel cell cells will be reduced. Therefore to discharge the water produced in the fuel cell to the outside, the supply gas pressure is pulsed to vary the gas flow velocity to remove water from the stack.

Figure 8:
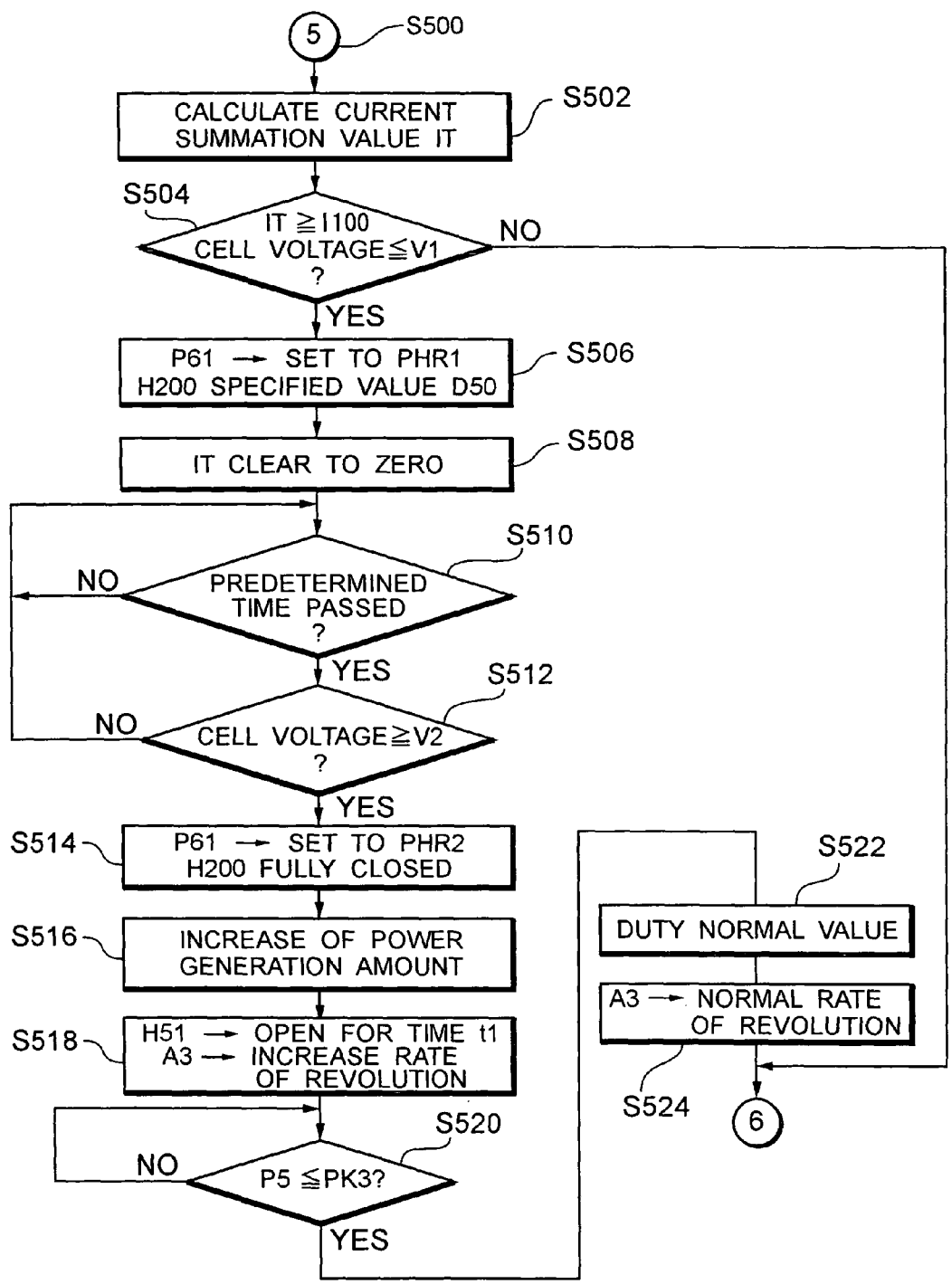
FIG. 8 is a flowchart explaining pulsed operation in the present embodiment.

As shown in the pulsed operation routine (S500) on FIG. 8, the output current of the fuel cell 20 per unit time is summed by a summation unit (or a summation program) not shown in the drawings, and the quantity of electricity generated is calculated. The water referred to above is produced as a result of an electrochemical reaction, and the amount of water produced is proportional to the amount of electricity generated. The control unit 50 reads the output current summation value IT (S502). It is determined whether this IT value is equal to or greater than a criterion value I100, or if the cell voltage of the fuel cell obtained as the output of the voltage sensor Vs is reduced below a criterion value V1 (S504). If the current summation value IT exceeds the criterion value I100, or if the cell voltage is reduced below the criterion value V1 (S504; YES), it is considered that water is accumulated within the cells (flooding). Therefore a strong gas flow is created to discharge the water outside the fuel cell 20.

While monitoring the measured pressure of the pressure sensor P61, the control unit 50 applies a degree of opening instruction value D50 signal to the degree of opening adjustment valve H200, as setting that will supply hydrogen gas at a high pressure Phr1 (S506). Next the current summation value IT is reset to "0" in preparation for the next operation (S508). This relatively high pressure hydrogen gas supply is continued for a predetermined period of time (S510), and when the cell voltage of the fuel cell 20 exceeds a predetermined criterion voltage V2 (S512), the control unit 50 closes the degree of opening adjustment valve H200 fully so that the output of the pressure sensor P61 becomes the relatively low gas pressure Phr2 (S514), the power generation is increased so the hydrogen gas within the fuel cell 20 and the circulation path is consumed which positively reduces the gas pressure. The electricity generated is used to charge a secondary battery, for example (S516). Next, the purge valve H51 is opened for a predetermined period of time t1 and the pressure in the hydrogen gas flow path 75 is reduced. In this case, the rate of revolution of the air pump A3 is increased to a predetermined rate to suppress the increase in concentration of discharged hydrogen in the discharge path 72 (S518).

If the control unit 50 determines that the hydrogen gas pressure at the inlet of the fuel cell 20 according to the output of the pressure sensor P5 has dropped below the low predetermined value Pk3 (S520), the degree of opening of the degree of opening adjustment valve H200 is set to the normal operating value (S522). Also, the rate of revolution of the air pump A3 is returned to the normal rate of revolution (S524).

In this way, in the hydrogen gas circulation path the hydrogen gas pressure is varied to high and low by the degree of opening adjustment valve H200 to form a pulse, and the water produced within the fuel cell is discharged to the outside by the high pressure and flow velocity variation.

Figure 9:
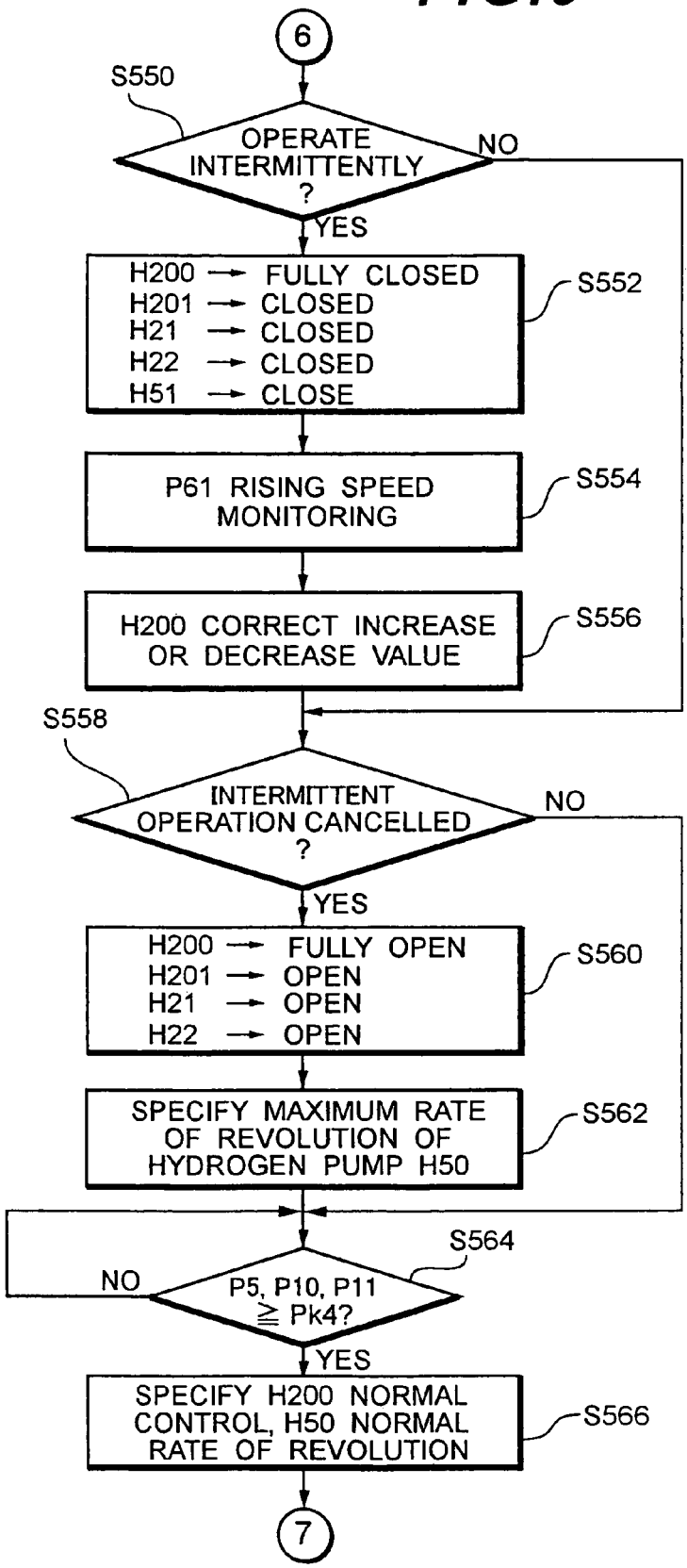
FIG. 9 is a flowchart explaining intermittent operation of the present embodiment.

FIG. 9 shows an example of intermittent operation by the degree of opening adjustment valve H200. Intermittent operation avoids a reduction in operation efficiency (fuel efficiency) by stopping the operation of the fuel cell 20 when the load on the fuel cell 20 is in the low load state, and power is supplied for the load and auxiliary equipment from a secondary battery.

When an intermittent operation flag is set to ON by setting a status flag not shown in the drawings, the control unit 50 executes this routine (S550; YES).

First, the control unit 50 closes the degree of opening adjustment valve H200, the hydrogen supply valve H201, the fuel cell inlet valve H21, and the outlet valve H22, and shuts off the hydrogen supply path 74 and the fuel cell 20 (S552). In this way generation operation is stopped.

The control unit 50 monitors the output of the pressure sensor P51, and monitors for a pressure change (rise) due to hydrogen leak from the degree of opening adjustment valve H200 (S554). If a change in pressure is observed the instruction value (increase or decrease value) to the degree of opening adjustment valve H200 is corrected to adjust for the leak (S556).

After correcting the degree of opening of the degree of opening adjustment valve H200, or after determination of intermittent operation (S550; NO), the degree of opening adjustment valve H200, the hydrogen supply valve H201, the inlet valve H21 and outlet valve H22 of the fuel cell 20, are opened, and hydrogen gas is supplied from the hydrogen supply source 30. When intermittent operation is cancelled the pressure of the hydrogen gas reduces due to cross leaks, so the degree of opening adjustment valve H200 is opened more than normally to rapidly supply hydrogen (S560). Also, the hydrogen pump H50 is operated at the maximum rate of revolution to increase the pressure of the hydrogen gas and stabilize generation (S562).

When the control unit 50 determines that the output of each of the pressure sensors P5, P10, and P11 exceeds the criterion value Pk4 and the hydrogen gas circulation paths 75 and 74 are filled with hydrogen (S564), normal operation control state of the degree of opening adjustment valve H200 is restored. Also, the rate of revolution of the hydrogen pump H50 is restored to the normal rate of revolution. In this way, the normal generation operation state of the fuel cell 20 is restored (S566).

In this way intermittent operation is carried out by controlling the degree of opening adjustment valve H200.

Figure 10:
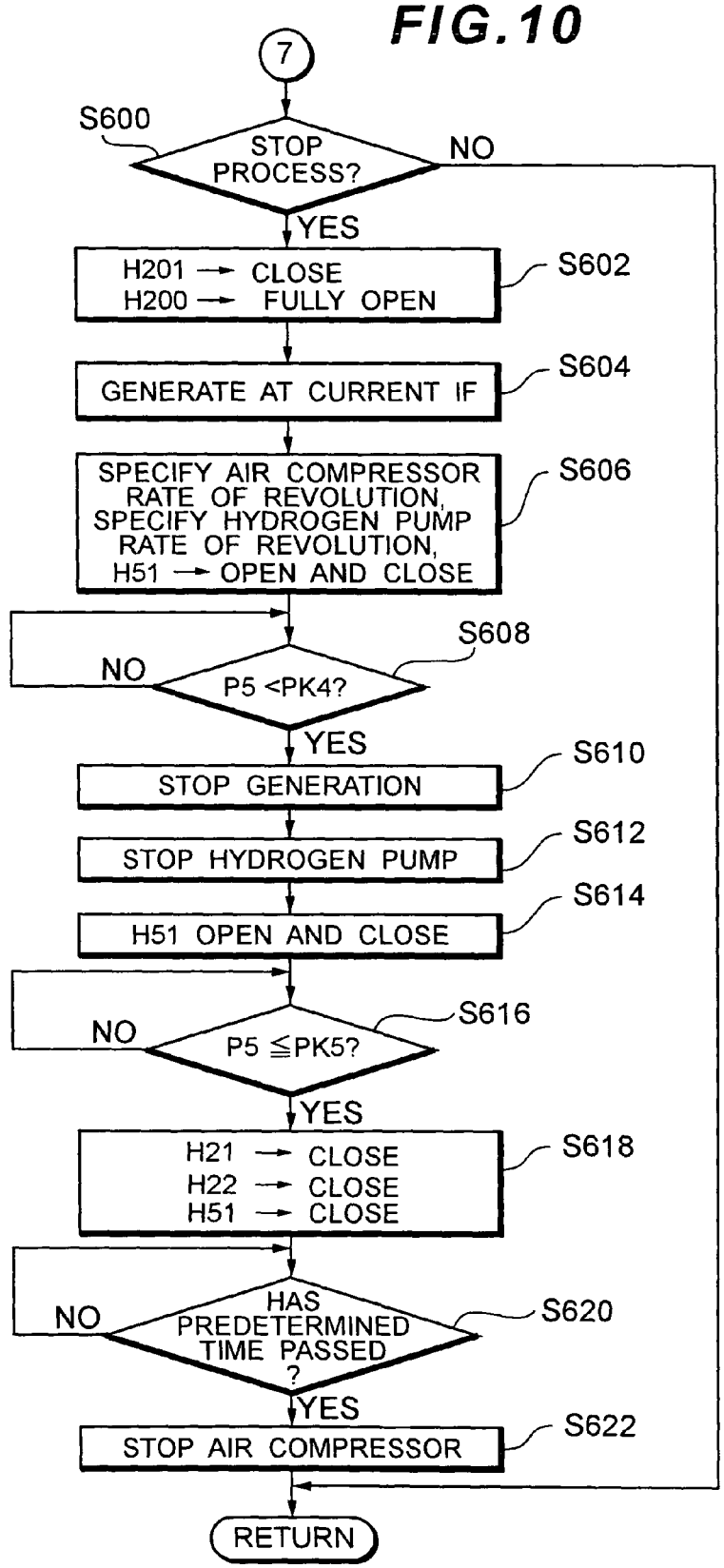
FIG. 10 is a flowchart explaining the fuel cell stopping process in the present embodiment.

Next, control of the degree of opening adjustment valve H200 to stop operation of the fuel cell 20 is explained with reference to the flowchart in FIG. 10.

In the stopping process in the present embodiment, the degree of opening adjustment valve H200 downstream of the pressure adjustment valve H9 is closed, the hydrogen pump H50 is rotated, hydrogen gas within the fuel cell 20 and the hydrogen circulation path is consumed, and pressure reduces due to power generation. When the pressure at the inlet of the fuel cell (anode pressure) falls below a predetermined value generation is stopped, and pressure is reduced using the purge valve. In this way, the time from start to finish of stopping the fuel cell can be shortened, and during this time reduction in cell voltage is prevented. Also, it is possible to suppress a rise in the concentration of hydrogen gas in the exhaust when stopping operation of the fuel cell.

When the control unit 50 is instructed to stop operation by turning the vehicle start key OFF, or the like, a stop flag is set in an internal flag register in the control unit 50, which is not shown in the drawings. The control unit 50 determines whether the operation stop flag has been set by either a periodic or interrupt process (S600). The control unit 50 reduces the pressure of the hydrogen gas in two stages to lead into the stopping operation. First, the shutoff valve H201 is closed and the degree of opening adjustment valve H200 is closed fully, to stop the supply of hydrogen (S602). The hydrogen gas in the fuel cell 20 and the circulation path is consumed while generating at a predetermined current If (S604). The air compressor A3 and the hydrogen pump H50 are operated at their respective predetermined rates of revolution, the purge valve H51 is operated intermittently to release hydrogen gas to the outside, and eliminate hydrogen gas from the hydrogen circulation path 75 and 74 (S606). When the control unit 50 determines that the inlet pressure P5 of the fuel cell 20 obtained from the output of the pressure sensor P5 has reduced below a predetermined criterion value pk4 (S608), the electrical conversion circuit of the power control unit 40 is shut off, and power generation stops (S610). Also, the hydrogen pump H50 is stopped, and the purge valve intermittently releases hydrogen gas to the outside (S614).

When the control unit 50 determines that the inlet pressure P5 of the fuel cell 20 obtained from the output of the pressure sensor P5 has reduced below Pk5 which is lower than the above criterion value Pk4 (S616), the inlet shutoff valve H21, the outlet shutoff valve H22, and the purge valve H51 are closed. In this way ingress to the anode side from outside is prevented (S618). Then, after a predetermined period of time t2 has passed (S620), the air compressor A3 which was operated to reduce the concentration of hydrogen gas in the exhaust is stopped (S622), which completes the stopping process. The control unit 50 returns to the main control program to respond to the next event.

In this way, operation is stopped by controlling the degree of opening adjustment valve H200.

Embodiment 2

Figure 11:
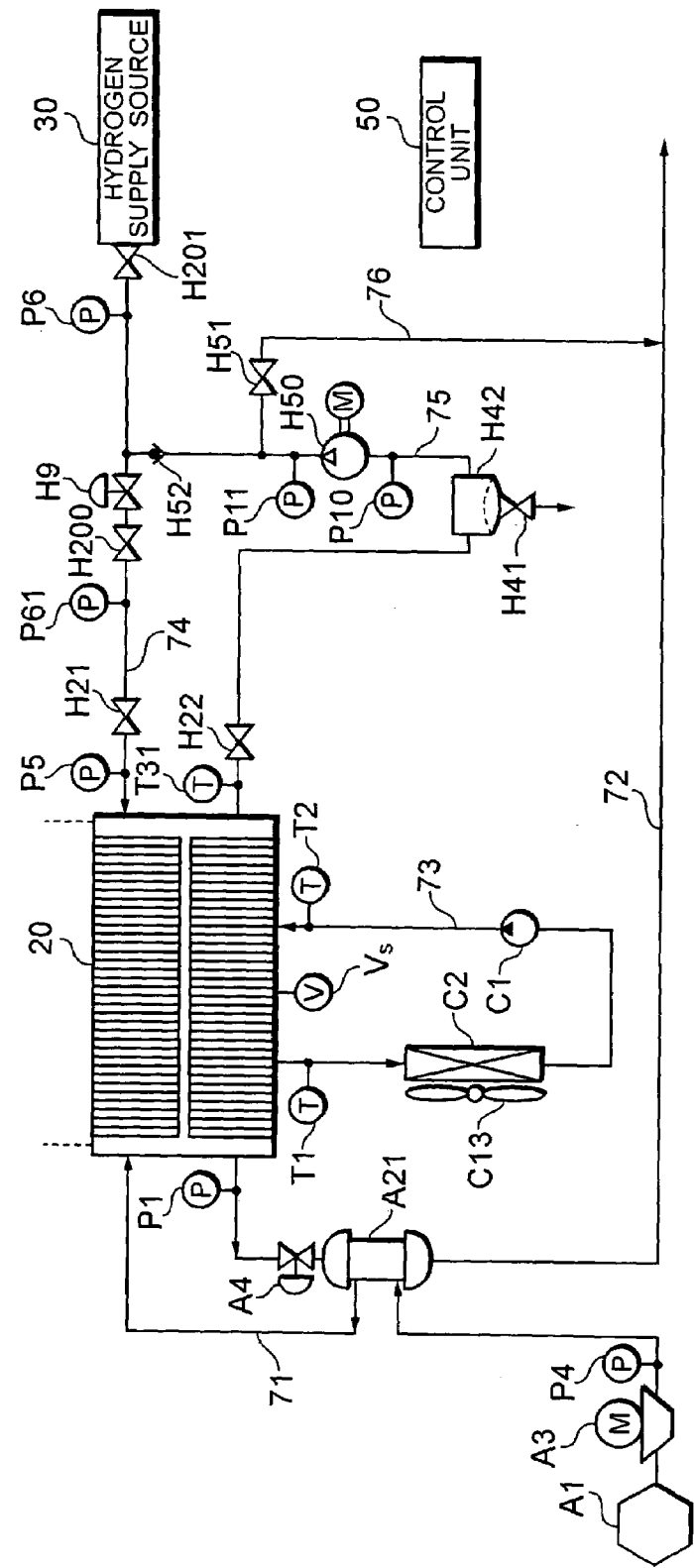
FIG. 11 is a block diagram explaining a fuel cell system (with hydrogen gas circulation upstream of the pressure adjustment valve) according to a second embodiment of the present invention.

Next, the second embodiment of the present invention will be explained with reference to FIG. 11. In this figure, parts corresponding to those in FIG. 1 are given the same symbol, and the explanation of those parts is omitted.

In this embodiment, the point of reflow of hydrogen gas from the hydrogen gas circulation path 75 is on the upstream side of the pressure adjustment valve H9. The pressure of the output of the hydrogen pump H50 is adjusted by the pressure adjustment valve H9. In this way, the output pressure and pressure fluctuations of the hydrogen pump H50 do not affect the system. Also, in the same way as the first embodiment, the supply hydrogen gas pressure to the anode is adjusted by the combination of the pressure adjustment valve H9 and the degree of opening adjustment valve H200. Hydrogen gas pressure adjustment can be continued with the diverse forms of control of the degree of opening adjustment valve H200.

Embodiment 3

FIG. 12 shows the third embodiment of the present invention. In this figure, parts corresponding to those in FIG. 1 are given the same symbol, and the explanation of those parts is omitted.

In this embodiment, a back pressure regulating valve (back pressure adjustment valve) H10 is used instead of the pressure adjustment valve H9. In the figure, H8 is a regulator. The degree of opening of the back pressure regulating valve H10 is adjusted so that the pressure downstream of the back pressure regulating valve H10 is a predetermined pressure, and the fuel cell 20 generation, purge amount, or the like, are controlled by a degree of opening adjustment valve H200 provided downstream of the back pressure regulating valve H10. For the degree of opening of the back pressure regulating valve H10, correction of the degree of opening of the valve for secondary pressure, and determination of a fault for the back pressure regulating valve H10 can be carried out with, the same method as was explained for the degree of opening adjustment valve H200 in the first embodiment.

By using the back pressure regulating valve H10, the hydrogen gas pressure applied to the degree of opening adjustment valve H200 can be maintained at a more constant pressure. It is difficult to perfectly seal the back pressure regulating valve H10, and even when the back pressure regulating valve H10 is shut the pressure downstream of the back pressure regulating valve H10 rises to the same pressure as the upstream side. Therefore, by using the back pressure regulating valve H10 in combination with the degree of opening adjustment valve H200, a rise in pressure (leak) due to the back pressure regulating valve H10 can be suppressed by closing the degree of opening adjustment valve H200.

Embodiment 4

FIG. 13 shows the fourth embodiment of the present invention. In this figure, parts corresponding to those in FIG. 1 are given the same symbol, and the explanation of those parts is omitted.

In this embodiment, a back pressure regulating valve H10 is used instead of the pressure adjustment valve H9, same as for the third embodiment, but the position of return of hydrogen gas from the hydrogen gas circulation path 75 is set to the upstream side of the back pressure regulating valve H10. Therefore, the outlet pressure and pressure fluctuations of the hydrogen pump H50 are absorbed by the back pressure regulating valve H10, so the effect of the hydrogen pump H50 is not felt, as for the second embodiment shown in FIG. 11. Also, the supply hydrogen gas pressure to the anode is adjusted by the combination of the back pressure regulating valve H10 and the degree of opening adjustment valve H200, in the same manner as the first embodiment. Many forms of control using the degree of opening adjustment valve H200 as described before can be also applied to this embodiment.

Embodiment 5

Figure 14:
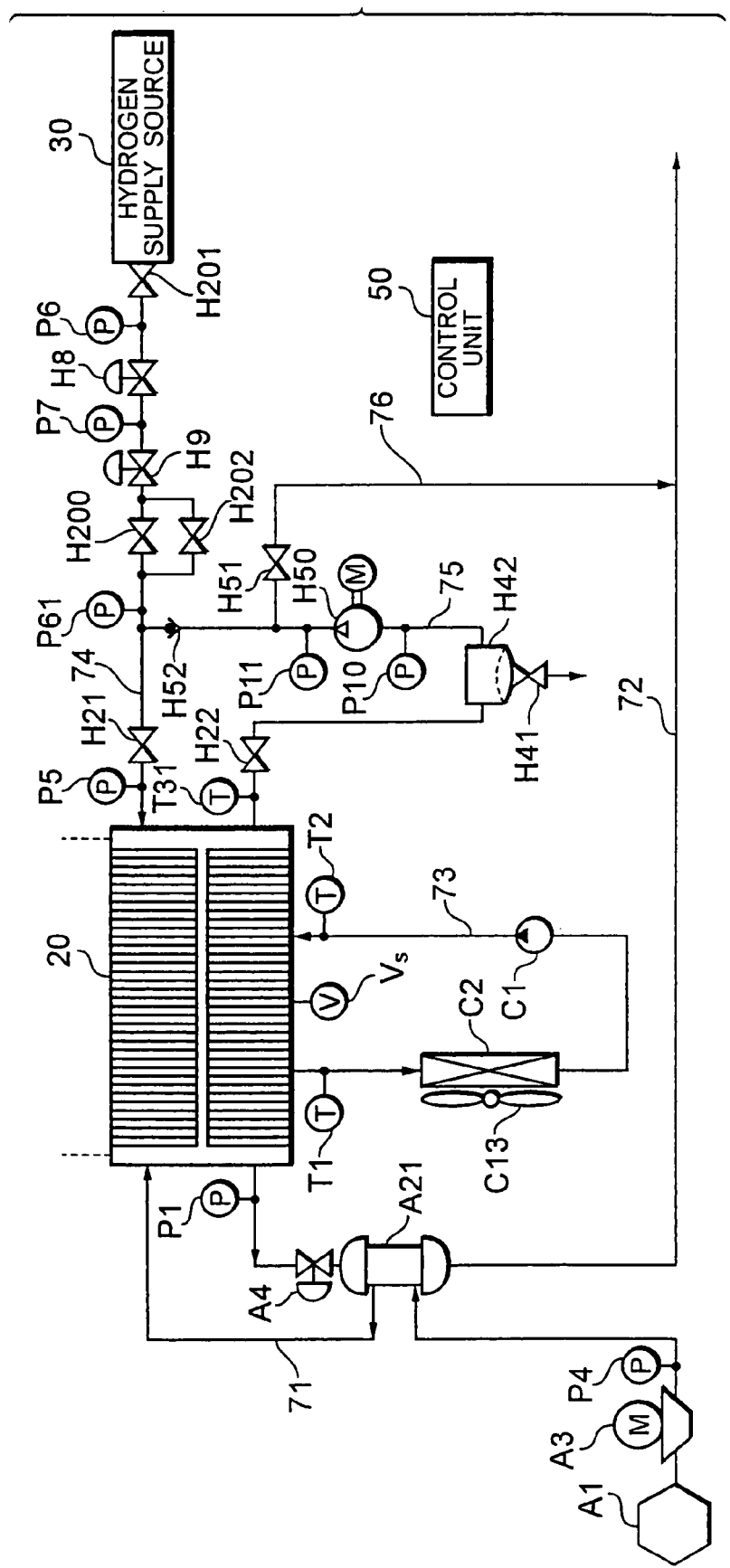
FIG. 14 is a block diagram explaining a fuel cell system (with a plurality of degree of opening adjustment valves) according to a fifth embodiment of the present invention.

FIG. 14 shows the fifth embodiment of the present invention. In this figure, parts corresponding to those in FIG. 1 are given the same symbol, and the explanation of those parts is omitted.

In this embodiment, a plurality of degree of opening adjustment valves with different flow rate characteristics are connected either in parallel or in series downstream of the back pressure regulating valve, and the degree of opening adjustment valves are used in accordance with the required pressure response.

Specifically, in the embodiment shown in FIG. 14, the degree of opening adjustment valves H200 and H202 are connected mutually in parallel in the supply path 74 between the pressure adjustment valve H9 and the inlet of the fuel cell 20. Each degree of opening adjustment valve is selected for their flow rate range, pressure adjustment range (degree of opening), withstand pressure, velocity response, degree of opening versus flow rate (or pressure reduction (pressure)) characteristics, capability to maintain closure, sealability, valve drive power, valve form, or the like. The rest of the configuration is the same as the embodiment of FIG. 1.

By allowing the combination of the pressure adjustment valve H9 and the degree of opening adjustment valves with differing flow characteristics H200 or H202 to be arbitrarily selected, the degree of opening adjustment valve H200 or H202 with the most desirable characteristics corresponding to the control situation of supply of hydrogen gas to the fuel cell 20 can be operated (use in accordance with the circumstances) to improve the control accuracy or pressure response.

In the configuration shown in FIG. 14, a back pressure regulating valve H10 may be used instead of the pressure adjustment valve H9.

Embodiment 6

Figure 15:
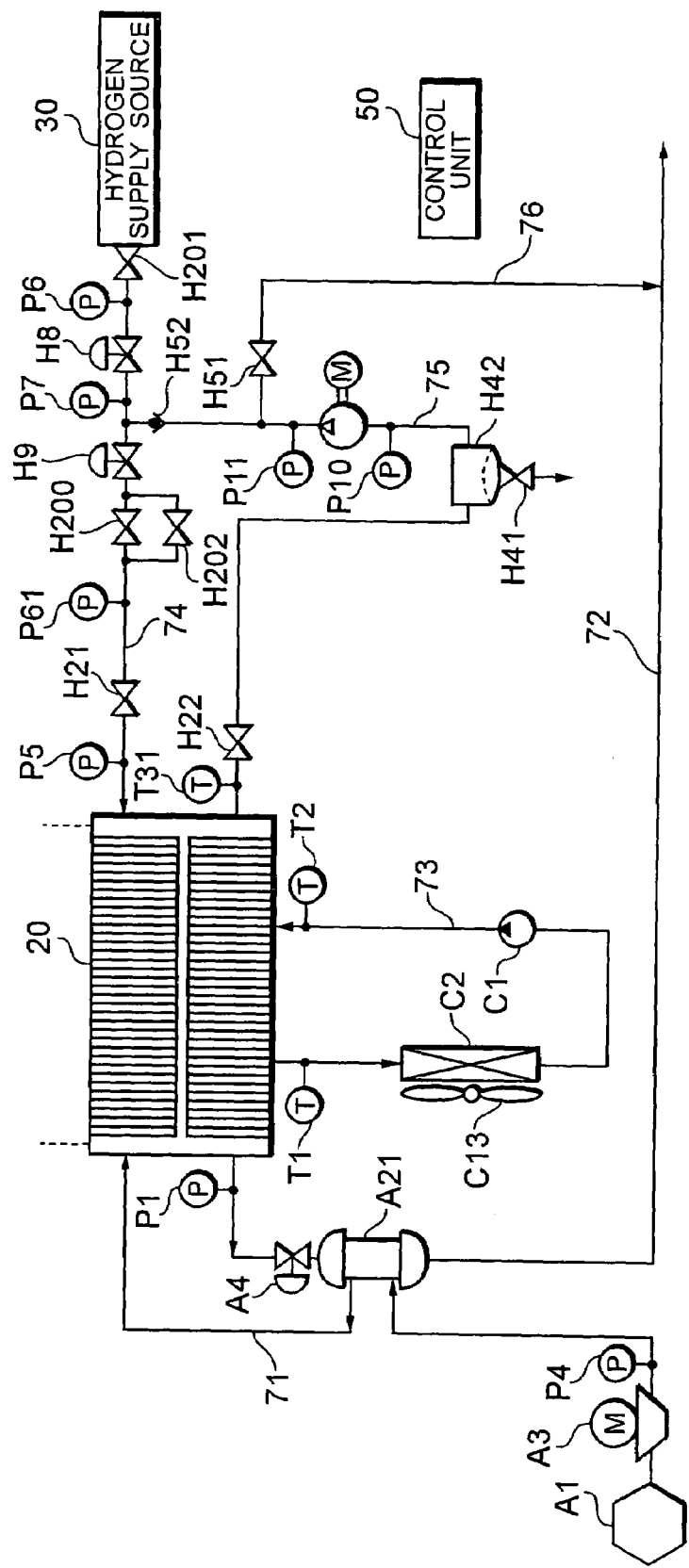
FIG. 15 is a block diagram explaining a fuel cell system (with a plurality of degree of opening adjustment valves, with hydrogen gas circulation upstream of the pressure adjustment valve) according to a sixth embodiment of the present invention.

FIG. 15 shows the sixth embodiment of the present invention. In this figure, parts corresponding to those in FIG. 1 are given the same symbol, and the explanation of those parts is omitted.

In this embodiment, the position of return of hydrogen gas from the hydrogen gas circulation path 75 is changed to the upstream side of the pressure adjustment valve H9 from the configuration of the fifth embodiment. Adopting this kind of configuration has the advantage that the pressure adjustment valve and the optimum degree of opening adjustment valve can be selected and used in combination, and in addition the outlet pressure and pressure fluctuations of the hydrogen pump H50 are absorbed by the pressure adjustment valve H9, so the effect of the hydrogen pump H50 is not felt In the configuration shown in FIG. 15, a back pressure regulating valve H10 may be used instead of the pressure adjustment valve H9.

Also, in each of the above embodiments, the degree of opening adjustment valve H200 is not limited to a linear degree of opening solenoid valve. An on-off shutoff valve in which the open state or the closed state can be selected and switched, in a form that the degree of opening of the valve can be appropriately adjusted by duty control or the like, may be used.

Also, the degree of opening adjustment valve H200 has a shutoff function (degree of opening 0) so it can function as the shutoff valve (inlet valve) H21 on the hydrogen supply port of the fuel cell 20. In this case the number of shutoff valves can be reduced.

I claim:

1. A fuel cell system that generates electricity using an electrochemical reaction of fuel gas and oxidizing gas, comprising:
   a fuel gas supply path that conducts the fuel gas from a fuel gas supply source to a fuel cell;
   a pressure adjustment valve provided on the fuel gas supply path that adjusts the supply gas pressure of the fuel gas;
   a degree of opening adjustment valve provided downstream of the pressure adjustment valve on the fuel gas supply path, the degree of opening thereof being set in accordance with a degree of opening adjustment signal;
   a control device that adjusts the degree of opening adjustment signal in accordance with an operating condition of the fuel cell system and controls the state quantity of fuel gas supplied to the fuel cell to a target quantity; and
   a measuring device that over time periodically measures a deviation in the degree of opening adjustment valve from an initial design value of the degree of opening adjustment valve, wherein the control device periodically adjusts the degree of opening adjustment signal in accordance with degree of opening characteristics of the degree of opening adjustment valve, the deviation, and an initial deviation.

2. The fuel cell system according to claim 1, wherein the control device adjusts the degree of opening adjustment signal to control the degree of opening of the degree of opening adjustment valve in accordance with not only the degree of opening characteristics of the degree of opening adjustment valve and the deviation but also at least one of the fuel cell power generation amount, the hydrogen consumption rate, the hydrogen purge amount, the pressure adjustment valve characteristics, and the pressure difference between the fuel cell cathode side gas pressure and the anode side gas pressure.

3. The fuel cell system according to claim 1, further comprising:
   a pressure sensor provided downstream of the degree of opening adjustment valve, wherein the control device adjusts the degree of opening adjustment signal in accordance with the measured pressure by the pressure sensor to control the degree of opening of the degree of opening adjustment valve.

4. The fuel cell system according to claim 1, further comprising:
   a fuel gas return flow path that returns fuel gas discharged from the outlet of the fuel cell to the fuel gas supply path, wherein the degree of opening adjustment valve is provided on the fuel gas supply path upstream of the junction of the fuel gas return flow path and the fuel gas supply path.

5. The fuel cell system according to claim 4, further comprising:
   a fuel gas return flow pump provided on the fuel gas return flow path, wherein the control device adjusts the degree of opening adjustment signal in accordance with the pump load on the fuel gas return flow pump, to control the degree of opening of the degree of opening adjustment valve.

6. The fuel cell system according to claim 1, wherein the deviation is measured from the upstream and downstream pressure of the degree of opening adjustment valve.

7. The fuel cell system according to claim 1, further comprising a fuel gas return flow path that returns fuel offgas discharged from the outlet of the fuel cell to the fuel gas supply path, wherein the junction of the fuel gas return flow path and the fuel gas supply path is set upstream of the pressure adjustment valve.

8. The fuel cell system according to claim 1, wherein the degree of opening adjustment valve is provided in a plurality on the fuel gas supply path, and the control device adjusts the degree of opening adjustment signal so that the valve degree of opening of each degree of opening adjustment valve equals a target value.

9. The fuel cell system according to claim 8, wherein the plurality of degree of opening adjustment valves are provided in parallel or in series.

10. The fuel cell system according to claim 9, wherein the flow rate characteristics of the respective degree of opening adjustment valves are mutually different.

11. The fuel cell system according to claim 1, wherein the operating condition of the fuel cell system is the operating condition when the fuel cell is operating.

12. The fuel cell system according to claim 1, wherein the setting of the degree of opening of the degree of opening adjustment valve is carried out in stages or continuously.

13. The fuel cell system according to claim 1, wherein the pressure adjustment valve is a mechanical type pressure adjustment valve.

14. The fuel cell system according to claim 13, wherein the degree of opening adjustment valve is an electromagnetically driven valve whose drive source is electromagnetic power.

* * * * *